(12) United States Patent
Ashrafi et al.

(10) Patent No.: US 9,793,615 B2
(45) Date of Patent: Oct. 17, 2017

(54) PATCH ANTENNA ARRAY FOR TRANSMISSION OF HERMITE-GAUSSIAN AND LAGUERRE GAUSSIAN BEAMS

(71) Applicant: NXGEN PARTNERS IP, LLC, Dallas, TX (US)

(72) Inventors: Solyman Ashrafi, Plano, TX (US); Roger D. Linquist, Dallas, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

(21) Appl. No.: 15/457,444

(22) Filed: Mar. 13, 2017

(65) Prior Publication Data

US 2017/0187125 A1 Jun. 29, 2017

Related U.S. Application Data

(63) Continuation of application No. 15/187,315, filed on Jun. 20, 2016, now Pat. No. 9,595,766.

(60) Provisional application No. 62/182,227, filed on Jun. 19, 2015, provisional application No. 62/233,838, filed on Sep. 28, 2015, provisional application No. 62/242,056, filed on Oct. 15, 2015, provisional application No. 62/311,633, filed on Mar. 22, 2016.

(51) Int. Cl.
*H01Q 21/06* (2006.01)
*H01Q 15/16* (2006.01)
*H01Q 3/26* (2006.01)

(52) U.S. Cl.
CPC .......... *H01Q 21/065* (2013.01); *H01Q 3/26* (2013.01); *H01Q 15/16* (2013.01)

(58) Field of Classification Search
CPC .................................................. H01Q 21/061

USPC ........................................................ 343/840
See application file for complete search history.

(56) References Cited

U.S. PATENT DOCUMENTS

| | | | |
|---|---|---|---|
| 3,459,466 A | 8/1969 | Giordmaine | |
| 3,614,722 A | 10/1971 | Jones | |
| 4,379,409 A | 4/1983 | Primbsch et al. | |
| 4,503,336 A | 3/1985 | Hutchin et al. | |
| 4,736,463 A | 4/1988 | Chavez | |
| 4,862,115 A | 8/1989 | Lee et al. | |

(Continued)

OTHER PUBLICATIONS

Solyman Ashrafi, Channeling Radiation of Electrons in Crystal Lattices, Essays on Classical and Quantum Dynamics, Gordon and Breach Science Publishers, 1991.

(Continued)

*Primary Examiner* — Graham Smith
(74) *Attorney, Agent, or Firm* — Munck Wilson Mandala, LLP

(57) ABSTRACT

An antenna array includes a plurality of patch antennas including a plurality of layers. Each of the plurality of layers are separated by a distance and each support a portion of the plurality of patch antennas. A plurality of connectors are each associated with one of the plurality of layers and supply a signal for transmission by the associated layer. A feed network on each of the plurality of layers provides a connection between a connector associated with the layer and the portion of the patch antennas located on the layer. Each layer transmits a signal having a different orthogonal function applied thereto that multiplexes each of the signals having a different orthogonal function applied thereto onto a single transmission beam. A parabolic reflector reflects the single transmission beam from the plurality of layers of the antenna array.

22 Claims, 18 Drawing Sheets

(56) References Cited

U.S. PATENT DOCUMENTS

| | | | |
|---|---|---|---|
| 5,051,754 | A | 9/1991 | Newberg |
| 5,220,163 | A | 6/1993 | Toughlian et al. |
| 5,222,071 | A | 6/1993 | Pezeshki et al. |
| 5,272,484 | A | 12/1993 | Labaar |
| 5,543,805 | A | 8/1996 | Thaniyavarn |
| 5,555,530 | A | 9/1996 | Meehan |
| 6,337,659 | B1 | 1/2002 | Kim |
| 6,992,829 | B1 | 1/2006 | Jennings et al. |
| 7,577,165 | B1 | 8/2009 | Barrett |
| 7,729,572 | B1 | 6/2010 | Pepper et al. |
| 7,792,431 | B2 | 9/2010 | Jennings et al. |
| 8,432,884 | B1 | 4/2013 | Ashrafi |
| 8,503,546 | B1 | 8/2013 | Ashrafi |
| 8,559,823 | B2 | 10/2013 | Izadpanah et al. |
| 8,811,366 | B2 | 8/2014 | Ashrafi |
| 9,077,577 | B1 | 7/2015 | Ashrafi |
| 2005/0254826 | A1 | 11/2005 | Jennings et al. |
| 2005/0259914 | A1 | 11/2005 | Padgett et al. |
| 2010/0013696 | A1 | 1/2010 | Schmitt et al. |
| 2012/0207470 | A1 | 8/2012 | Djordevic et al. |
| 2013/0027774 | A1 | 1/2013 | Bovino et al. |
| 2013/0235744 | A1 | 9/2013 | Chen et al. |
| 2014/0355624 | A1 | 12/2014 | Li et al. |
| 2015/0098697 | A1 | 4/2015 | Marom et al. |

OTHER PUBLICATIONS

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Momentum Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bits/s/Hz in a 3 Gbit/S Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Acoustically induced stresses in elastic cylinders and their visualization, The Journal of the Acoustical Society of America 82(4):1378-1385, Sep. 1987.

Solyman Ashrafi, Splitting of channeling-radiation peaks in strained-layer superlattices, Journal of the Optical Society of America B 8(12), Nov. 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

(56) References Cited

OTHER PUBLICATIONS

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/ Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al.; Patch Antenna Array for the Generation of Millimeter-wave Hermite-Gaussian Beams, IEEE Antennas and Wireless Propagation Letters; 2016.

Yongxiong Ren et al.; Experimental Investigation of Data Transmission Over a Graded-index Multimode Fiber Using the Basis of Orbital Angular Momentum Modes.

Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).

Li, X. et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Rapport, T.S.; Millimeter Wave Mobile Communications for 5G Cellular: It Will Work!; IEEE Access, 1, 335-349 (2013).

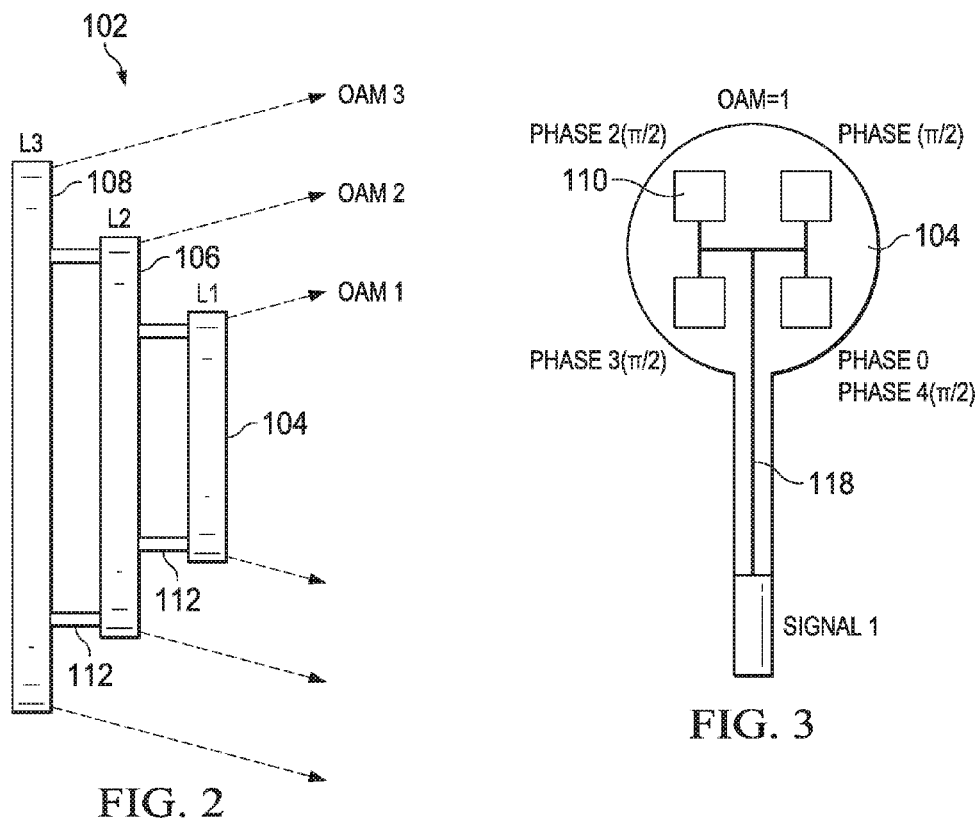
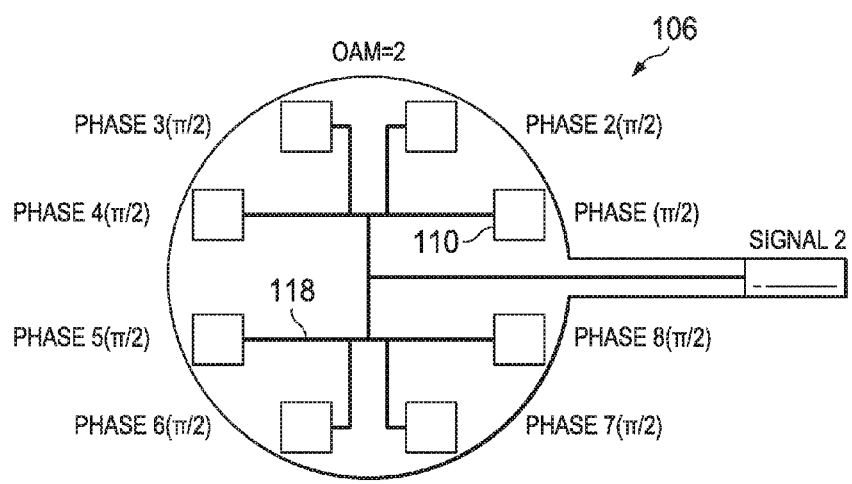

US 9,793,615 B2

PATCH ANTENNA ARRAY FOR TRANSMISSION OF HERMITE-GAUSSIAN AND LAGUERRE GAUSSIAN BEAMS

CROSS-REFERENCE TO RELATED APPLICATIONS

This application is a continuation application of U.S. patent application Ser. No. 15/187,315, filed Jun. 20, 2016, entitled PATCH ANTENNA ARRAY FOR TRANSMISSION OF HERMITE-GAUSSIAN AND LAGUERRE GAUSSIAN BEAMS (Atty. Dkt. No. NXGN-33142), which claims priority to U.S. Provisional Application No. 62/182,227, entitled PATCH ANTENNAS FOR TRANSMISSION OF HERMITE-GAUSSIAN AND LAGUERRE-GAUSSIAN BEAMS, filed on Jun. 19, 2015; U.S. Provisional No. 62/233,838, entitled PATCH ANTENNAS FOR TRANSMISSION OF HERMITE-GAUSSIAN AND LAGUERRE-GAUSSIAN BEAMS, filed on Sep. 28, 2015; U.S. Provisional Application No. 62/242,056, entitled METHOD FOR MANUFACTURING A PATCH ANTENNA, filed on Oct. 15, 2015; and U.S. Provisional Application No. 62/311,633, entitled HYBRID PATCH ANTENNA WITH PARABOLIC REFLECTOR, filed on Mar. 22, 2016, each of which is incorporated herein by reference in their entirety.

TECHNICAL FIELD

The present application relates to patch antennas, and more particularly to patch antennas for the transmission of Hermite-Gaussian and Laguerre-Gaussian Beams.

BACKGROUND

When transmitting Hermite-Gaussian and Laguerre-Gaussian beams, the ability to multiplex multiple modes of these type of beams together into a single signal is needed to provide increased bandwidth. By increasing the number of Hermite-Gaussian and Laguerre-Gaussian beams that can be multiplexed together, an increased data throughput can be achieved. Thus, there is a need for antenna and transmission structures that provide for multiplexing of Hermite-Gaussian and Laguerre-Gaussian beams.

SUMMARY

The present invention, as disclosed and described herein, in one aspect thereof comprises a multi-level antenna array including a plurality of patch antennas. The antenna further includes a plurality of layers. Each of the plurality of layers are separated from each other by a distance and each of the plurality of layers further support a portion of the plurality of patch antennas. A plurality of connectors are each associated with one of the plurality of layers and supply a signal for transmission by the associated layer. A feed network on each of the plurality of layers provides a connection between a connector of the plurality of connectors associated with the layer and the portion of the plurality of patch antennas located on the layer. Each layer of the plurality of layers transmits the signal having a different orthogonal function applied thereto that multiplexes each of the signals having a different orthogonal function applied thereto onto a single transmission beam. A parabolic reflector reflects the single transmission beam from the plurality of layers of the multi-level antenna array.

BRIEF DESCRIPTION OF THE DRAWINGS

For a more complete understanding, reference is now made to the following description taken in conjunction with the accompanying Drawings in which:

FIG. 2 illustrates a side view of a multilayer patch antenna array;

FIG. 3 illustrates a first layer of a multilayer patch antenna array;

FIG. 4 illustrates a second layer of a multilayer patch antenna array;

DETAILED DESCRIPTION

Figure 1:
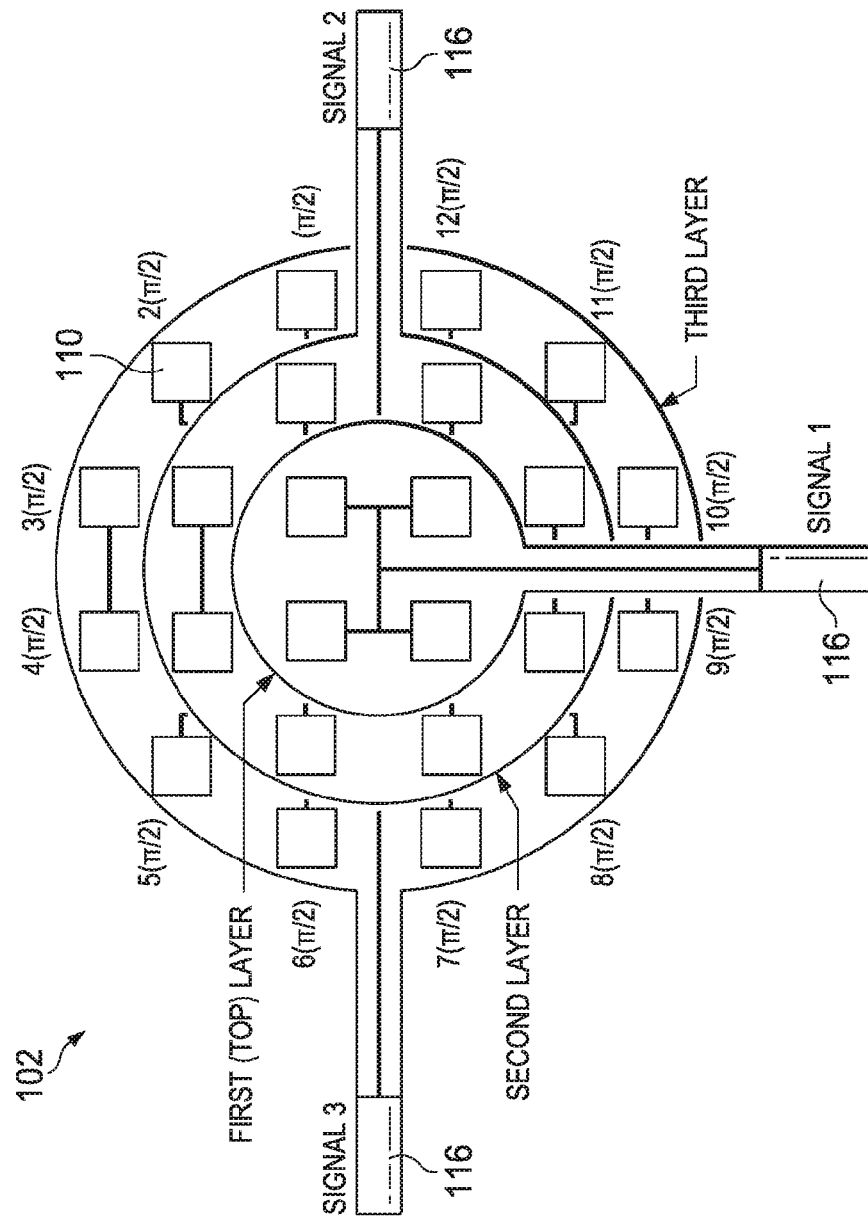
FIG. 1 illustrates a top view of a multilayer patch antenna array.

Referring now to the drawings, wherein like reference numbers are used herein to designate like elements throughout, the various views and embodiments of a patch antenna array for transmission of Hermite-Gaussian and Laguerre-Gaussian beams are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a multilayer patch antenna array 102. The multilayer patch antenna array 102 includes a first antenna layer 104 for transmitting a first ordered beam, a second antenna layer 106 for transmitting a second ordered beam and a third layer 108 for transmitting a third ordered beam. Each of the layers 104, 106 and 108 are stacked on a same center. While the present embodiment is illustrated with respect to a multilayer patch antenna array 102 including only three layers, it should be realized that either more or less layers may be implemented in a similar fashion as described herein. On the surface of each of the layers 104, 106 and 108 are placed patch antennas 110. Each of the patch antennas are placed such that they are not obscured by the above layer. The layers 104, 106 and 108 are separated from each other by layer separator members 112 that provide spacing between each of the layers 104, 106 and 108. The configuration of the layers of the patch antenna may be in rectangular, circular or elliptical configurations to generate Hermite-Gaussian, Laguerre-Gaussian or Ince-Gaussian beams.

The patch antennas 110 used within the multilayer patch antenna array 102 are made from FR408 (flame retardant 408) laminate that is manufactured by Isola Global, of Chandler Ariz. and has a relative permittivity of approximately 3.75. The antenna has an overall height of 125 µm. The metal of the antenna is copper having a thickness of approximately 12 µm. The patch antenna is designed to have an operating frequency of 73 GHz and a free space wavelength of 4.1 mm. The dimensions of the input 50 Ohm line of the antenna is 280 µm while the input dimensions of the 100 Ohm line are 66 µm.

Each of the patch antennas 110 are configured to transmit signals at a predetermined phase that is different from the phase of each of the other patch antenna 110 on a same layer. Thus, as further illustrated in FIG. 3, there are four patch antenna elements 110 included on a layer 104. Each of the antenna elements 104 have a separate phase associated there with as indicated in FIG. 3. These phases include $\pi/2$, $2(\pi/2)$, $3(\pi/2)$ and $4(\pi/2)$. Similarly, as illustrated in FIG. 4 layer 106 includes eight different patch antenna elements 110 including the phases $\pi/2$, $2(\pi/2)$, $3(\pi/2)$, $4(\pi/2)$, $5(\pi/2)$, $6(\pi/2)$, $7(\pi/2)$ and $8(\pi/2)$ as indicated. Finally, referring back to FIG. 1, there are included 12 patch antenna elements 110 on layer 108. Each of these patch antenna elements 110 have a phase assigned thereto in the manner indicated in FIG. 1. These phases include $\pi/2$, $2(\pi/2)$, $3(\pi/2)$, $4(\pi/2)$, $5(\pi/2)$, $6(\pi/2)$, $7(\pi/2)$, $8(\pi/2)$, $9(\pi/2)$, $10(\pi/2)$, $11(\pi/2)$ and $12(\pi/2)$.

Each of the antenna layers 104, 106 and 108 are connected to a coaxial end-launch connector 116 to feed each layer of the multilayer patch antenna array 102. Each of the connectors 116 are connected to receive a separate signal that allows the transmission of a separate ordered antenna beam in a manner similar to that illustrated in FIG. 2. The emitted beams are multiplexed together by the multilayered patch antenna array 102. The orthogonal wavefronts transmitted from each layer of the multilayered patch antenna array 102 in a spatial manner to increase capacity as each wavefront will act as an independent Eigen channel. The signals are multiplexed onto a single frequency and propagate without interference or crosstalk between the multiplexed signals. While the illustration with respect to FIG. 2 illustrates the transmission of OAM beams at OAM 1, OAM 2 and OAM 3 ordered levels.

It should be understood that other types of Hermite Gaussian and Laguerre Gaussian beams can be transmitted using the multilayer patch antenna array 102 illustrated. Hermite-Gaussian polynomials and Laguerre-Gaussian polynomials are examples of classical orthogonal polynomial sequences, which are the Eigenstates of a quantum harmonic oscillator. However, it should be understood that other signals may also be used, for example orthogonal polynomials or functions such as Jacobi polynomials, Gegenbauer polynomials, Legendre polynomials and Chebyshev polynomials. Legendre functions, Bessel functions, prolate spheroidal functions and Ince-Gaussian functions may also be used. Q-functions are another class of functions that can be employed as a basis for orthogonal functions.

The feeding network 118 illustrated on each of the layers 104, 106, 108 uses delay lines of differing lengths in order to establish the phase of each patch antenna element 110. By configuring the phases as illustrated in FIGS. 1-3 the OAM beams of different orders are generated and multiplexed together.

Figure 5:
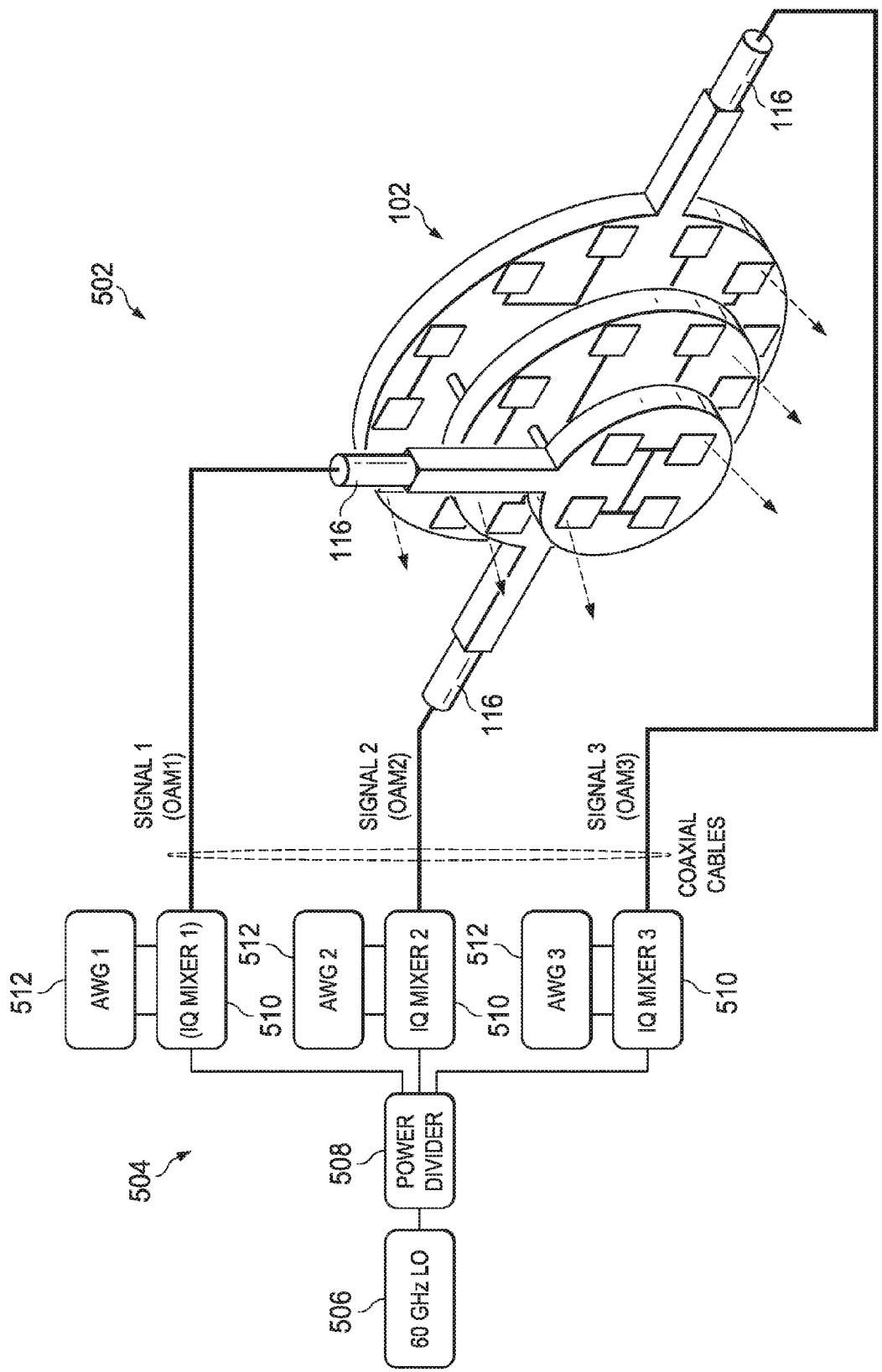
FIG. 5 illustrates a transmitter for use with a multilayer patch antenna array.

Referring now to FIG. 5, there is illustrated a transmitter 502 for generating a multiplexed beam for transmission. As discussed previously, the multilayered patch antenna array 102 includes a connector 116 associated with each layer 104, 106, 108 of the multilayer patch antenna array 102. Each of these connectors 116 are connected with signal generation circuitry 504. The signal generation circuitry 504 includes, in one embodiment, a 60 GHz local oscillator 506 for generating a 60 GHz carrier signal. The signal generation circuit 504 may also work with other frequencies, such as 70/80 GHz. The 60 GHz signal is output from the local oscillator 506 to a power divider circuit 508 which separates the 60 GHz signal into three separate transmission signals. Each of these separated transmission signals are provided to an IQ mixer 510 that are each connected to one of the layer input connectors 116. The IQ mixer circuits 510 are connected to an associated additive white gaussian noise circuit 512 for inserting a noise element into the generated transmission signal. The AWG circuit 512 may also generate SuperQAM signals for insertion in to the transmission signals. The IQ mixer 510 generates signals in a manner such as that described in U.S. patent application Ser. No. 14/323,082, filed on Jul. 3, 2014, now U.S. Pat. No. 9,331,875, issued on May 3, 2016, entitled SYSTEM AND METHOD FOR COMMUNICATION USING ORBITAL ANGULAR MOMENTUM WITH MULTIPLE LAYER OVERLAY MODULATION, which is incorporated herein by reference in its entirety.

Figure 6:
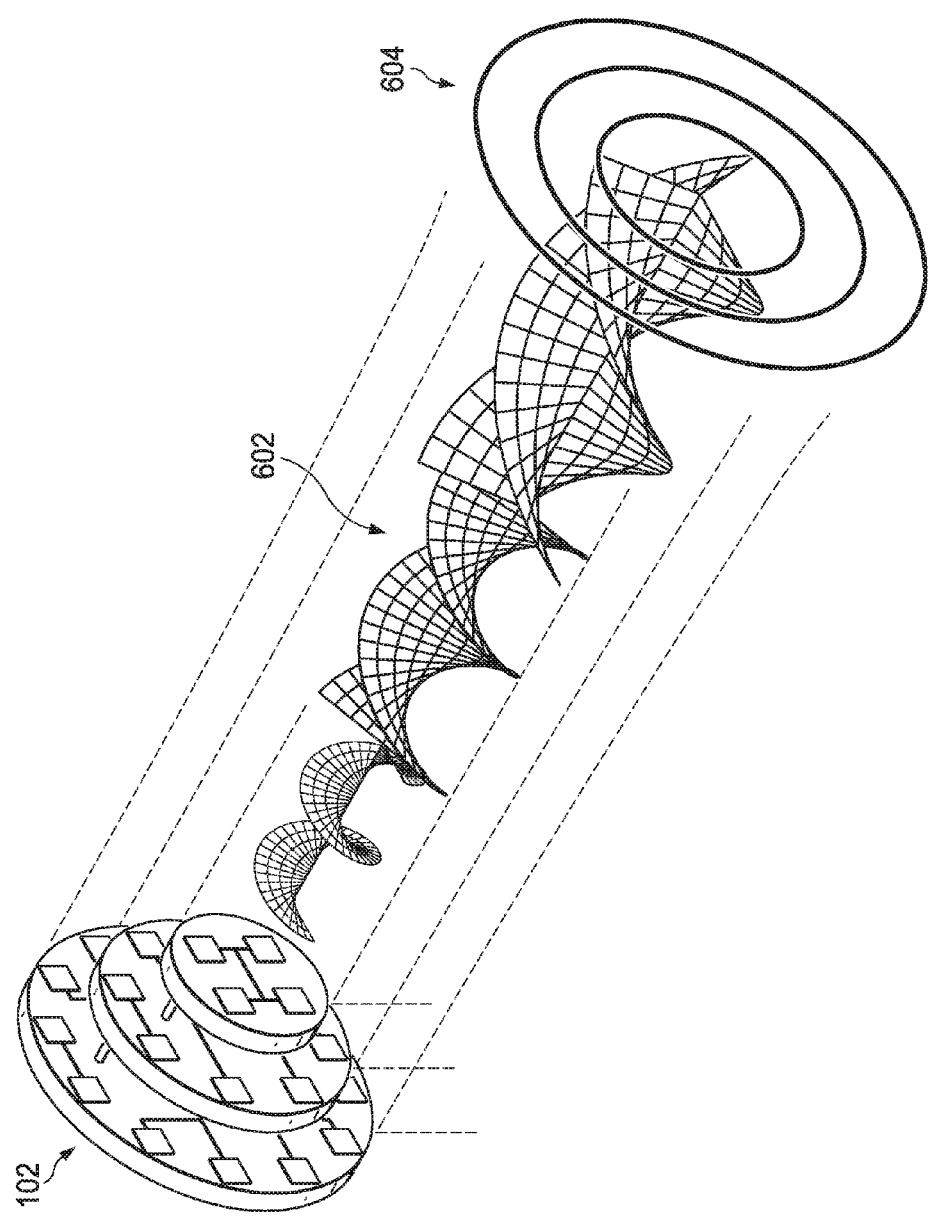
FIG. 6 illustrates a multiplexed OAM signal transmitted from a multilayer patch antenna array.

Using the transmitter 502 illustrated in FIG. 5. A multiplexed beam (Hermite Gaussian, Laguerre Gaussian, etc.) can be generated as illustrated in FIG. 6. As illustrated, the multilayered patch antenna array 102 will generate a multiplexed beam 602 for transmission. In the present example, there is illustrated a multiplex OAM beam that has twists for various order OAM signals in a manner similar to that disclosed in U.S. patent application Ser. No. 14/323,082. An associated receiver detector would detect the various OAM rings 604 as illustrated each of the rings associated with a separate OAM processed signal.

When signals are transmitted in free space (vacuum), the signals are transmitted as plane waves. They may be represented as described herein below. Free space comprises a nonconducting medium ($\sigma=0$) and thus $J=\sigma E=0$.

From experimental results Ampere's law and Faraday's law are represented as:

$\vec{B} = \mu \vec{H}$     $\nabla \times H = \dfrac{\partial D}{\partial t} + J$     Ampere's $\vec{D} = \in \vec{E}$ $\vec{J} = \sigma \vec{E}$     $\nabla \times E = \dfrac{-\partial B}{\partial t}$     Faraday's If there is propagation in the z direction and therefore E and H are in the xy plane.

Without the loss of any generality E may be oriented in the x-direction and H may be oriented in the y-direction thus providing propagation in the z-direction. From Ampere's-Maxwell equation, the following equations are provided:

$$\nabla \times H = \dfrac{\partial D}{\partial t}$$

$$\nabla \times H = \begin{vmatrix} \hat{x} & \hat{y} & \hat{z} \\ \dfrac{\partial}{\partial x} & \dfrac{\partial}{\partial y} & \dfrac{\partial}{\partial z} \\ H_x & H_y & H_z \end{vmatrix}$$

$$\left(\dfrac{\partial Hz}{\partial y} - \dfrac{\partial Hy}{\partial z}\right)\hat{x} + \left(\dfrac{\partial Hz}{\partial z} - \dfrac{\partial Hz}{\partial x}\right)\hat{y} + \left(\dfrac{\partial Hy}{\partial x} - \dfrac{\partial Hx}{\partial y}\right)\hat{z} = \dfrac{\partial}{\partial t} \in E$$

Next, the vectorial wave equations may be represented as:

$$\nabla \times H = \dfrac{\partial D}{\partial t} + J$$

$$\nabla \times H = \in \dfrac{\partial E}{\partial t}$$

$$\nabla \times E = \dfrac{-\partial B}{\partial t}$$

$$\nabla \times E = -\mu \dfrac{\partial H}{\partial t}$$

$$\nabla \times B = 0$$

$$\nabla \times E = S$$

$$\nabla \times \nabla \times H = \nabla(\nabla H) - \nabla^2 H = -\nabla^2 H$$

$$\nabla \times \nabla \times E = \nabla(\nabla E) - \nabla^2 E = -\nabla^2 E$$

$$\nabla \times (\nabla \times H) = \nabla \times \left(\in \dfrac{\partial E}{\partial t}\right) = \in \dfrac{\partial}{\partial t}(\nabla \times E)$$

$$= \in \mu \dfrac{\partial}{\partial t}\left(\dfrac{\partial}{\partial t} H\right)$$

$$\nabla^2 H = + \in \mu \dfrac{\partial^2}{\partial t^2} H$$

$$\nabla^2 H - \in \mu \dfrac{\partial^2}{\partial t^2} H = 0$$

$$\nabla \times (\nabla \times E) = \nabla \times \left(-\mu \dfrac{\partial}{\partial t} H\right)$$

$$= -\mu \dfrac{\partial}{\partial t}(\nabla \times H)$$

$$= -\mu \dfrac{\partial}{\partial t}\left(\in \dfrac{\partial E}{\partial t}\right)$$

$$+\nabla^2 E = +\mu \in \dfrac{\partial^2}{\partial t^2} E$$

$$\nabla^2 E - \mu \in \dfrac{\partial^2}{\partial t^1} E = 0$$

Therefore in general:

$$\vec{\nabla}^2 \vec{E} + \vec{K}^2 \vec{E} = 0 E(\vec{r}, t)$$

$\vec{E}(r,t) = \vec{E}(\vec{r})e^{-jwt}e^{jkz}$ Propagating in z-direction

Therefore:

$$\left(\dfrac{\partial^2}{\partial x^2} + \dfrac{\partial^2}{\partial y^2} + \dfrac{\partial^2}{\partial z^2}\right)\vec{E}(\vec{r})e^{-jwt}e^{jkz} + \dfrac{w^2}{y^2}\vec{E}(\vec{r})e^{-jwt}e^{jkz} = 0$$

In free space $$w = \dfrac{1}{\sqrt{\mu \in}} = \to c = \dfrac{1}{\sqrt{\mu \in_o}}$$

$$k^2 = \dfrac{w^2}{c^2}$$

Now:

$$\dfrac{\partial}{\partial z}\vec{E}(\vec{r})e^{jkz} = e^{jkz}\left[\dfrac{\partial \vec{E}(\vec{r})}{\partial z} + jk\vec{E}(\vec{r})\right]$$

$$\dfrac{\partial}{\partial z}\vec{E}(\vec{r})e^{jkz} = e^{jkz}\left[\dfrac{\partial \vec{E}(\vec{r})}{\partial z} + jk\vec{E}(\vec{r})\right] + e^{jkz}\left[\dfrac{\partial^2 \vec{E}(\vec{r})}{\partial z^2} + jk\dfrac{\partial \vec{E}(\vec{r})}{\partial z}\right]$$

$$= e^{jkz}\left[jk\dfrac{\partial \vec{E}}{\partial z} - k^2\vec{E}(\vec{r})\right] + e^{jkz}\left[\dfrac{\partial^2 \vec{E}}{\partial z^2} + jk\dfrac{\partial \vec{E}}{\partial z}\right]$$

Because $$\left|2k\dfrac{\partial E}{\partial z}\right| \gg \left|\dfrac{\partial^2 E(r)}{\partial z^2}\right|$$

Paraxial assumption $$\dfrac{\partial^2 \vec{E}(\vec{r})e^{jkz}}{\partial z^2} = e^{jkz}\left[2jk\dfrac{\partial^2 \vec{E}(\vec{r})}{\partial z} - k^2\vec{E}(\vec{r})\right]$$

Then:

$$\left(\dfrac{\partial^2}{\partial x^2} + \dfrac{\partial^2}{\partial y^2} + 2jk\dfrac{\partial^2}{\partial z}\right)E(x, y, z) = 0$$

Which may be represented in cylindrical coordinates as:

$$\dfrac{\partial^2}{\partial x^2} + \dfrac{\partial^2}{\partial y^2} = \dfrac{1}{q}\dfrac{\partial}{\partial q}\left(q\dfrac{\partial}{\partial q}\right) + \dfrac{1}{q^2}\dfrac{\partial^2}{\partial \Phi^2}$$

This provides a paraxial wave equation in cylindrical coordinates:

$$\dfrac{1}{q}\dfrac{\partial}{\partial q}\left(q\dfrac{\partial}{\partial q}\right)E(q, \Phi, z) + \dfrac{1}{q^2}\dfrac{\partial^2}{\partial \Phi^2}E(q, \Phi, z) + 2jk\dfrac{\partial E}{\partial z}(q, \Phi, z) = o$$

$P(z), q(z)$

Then:

$$E_0 \sim e^{-j\left[p+\frac{k}{2q}(x^2+y^2)\right]}$$

In general $E_o$ can rotate on the xy-plane and the wave still propagates in the z-direction.

$$\frac{\partial q}{\partial z} = 1$$

$$\frac{\partial p}{\partial z} = -\frac{j}{q}$$

q~Curvature of the phase front near the optical axis.

$$q_2 = q_1 + z$$

where $q_2$ is the output plane and $q_1$ is the input plane.∞∞

$$\frac{1}{q} = \frac{1}{R} - j\frac{\lambda}{\pi W^2}$$

where $$\frac{1}{R}$$

is the curvature of the wavefront intersecting the z-axis.

Thus for a complete plane wave R=∞, the equation becomes:

$$\frac{1}{q} = \frac{1}{R \to \infty} - j\frac{\lambda}{\pi W^2}$$

$$q_0 = \frac{\pi W^2}{-j\lambda} = \frac{j\pi W_0^2}{\lambda}$$

where $W_o$ is the beam waist.

$$q = q_0 + z = \frac{j\pi W_0^2}{\lambda} + z$$

$$w(z) = w_0\sqrt{1+\left(\frac{z}{z_r}\right)^2}$$

$$W^2(z) = W_0^2\left[1+\left(\frac{\lambda z}{\pi W_0^2}\right)^2\right]$$

$$R(z) = z\left[1+\left(\frac{\pi W_0^2}{\lambda z}\right)^2\right]$$

$$R(z) = z\left[1+\left(\frac{z_R}{z}\right)^2\right]$$

$$\Phi(z) = \tan^{-1}\left(\frac{z}{z_R}\right)$$

$$\theta = \frac{\lambda}{\pi w_0}$$

$$z = z_R$$

$$w(z) = \sqrt{2}\,w_0$$

The Rayleigh length is:

$$z_R = \frac{\pi n}{\lambda_0}$$

where n is the index of refraction.

$$w_0^2 = \frac{w^2}{1+\left(\frac{\pi w^2}{\lambda R}\right)^2}$$

$$z = \frac{R}{1+\left(\frac{\lambda R}{\pi w^2}\right)^2}$$

The complex phase shift is represented by:

$$jP(z) = \mathrm{Ln}\left[1 - j\left(\frac{\lambda z}{\pi w_0^2}\right)\right] = \mathrm{Ln}\sqrt{1+\left(\frac{\lambda z}{\pi w_0^2}\right)^2} - j\tan^{-1}\frac{\lambda z}{\pi w_0^2}$$

The real part of P(z) represents a phase shift difference between the Gaussian beam and an ideal plane wave. Thus the fundamental mode is provided:

$$E_0(x, y, z) = E_0(r, z)\frac{w_0}{w}e^{-j(jz-\phi)}e^{-r^2\left(\frac{1}{w^2}+\frac{jk}{2R}\right)}$$

where:

$$\phi = \tan^{-1}\frac{\lambda z}{\pi w_0^2}$$

Higher order modes may also provide other solutions. The solution of rectangular equation:

$$\left(\frac{\partial^2}{\partial x^2}+\frac{\partial^2}{\partial y^2}+2jk\frac{\partial}{\partial z}\right)E(x, y, z) = 0$$

Can be determined in rectangular coordinates to be:

$$E(x, y, z) = \sum_{mn} C_{nm}E_0\frac{w_0}{w(z)}H_m\left[\frac{\sqrt{2}\,x}{w(z)}\right]H_n\left[\frac{\sqrt{2}\,y}{w(z)}\right]e^{\frac{-(x^2+y^2)}{w(t)^2}}e^{-j(m+m+1)\tan^{-1}\frac{z}{z_0}}e^{j\frac{k(x^2+y^2)}{2R(z)}}$$

$$z_0 = \frac{kw_0^2}{2}$$

$$w(z) = w_0\sqrt{1+\frac{z^2}{z_0^2}}$$

-continued $C_{60} \Rightarrow TEM_{OD}$ $$R(z) = z + \frac{z_0^2}{z} = \frac{z_0^2}{z}\left(1 + \frac{z^2}{z_0^2}\right) = \frac{z_0^2}{zw_0^2}w^2(z) = \frac{kz_0}{2z}w^2(z)$$

The solution of cylindrical coordinates of equation:

$$\frac{1}{\rho}\frac{\partial}{\partial \rho}\left(\rho\frac{\partial}{\partial \rho}\right)E(\rho, \phi, z) + \frac{1}{\rho^2}\frac{\partial^{\wedge} 2E(\rho, \phi, z)}{\delta\phi^2} + 2jk\frac{\partial E(\rho, \phi, z)}{\partial z} = 0$$

Can be determined in cylindrical coordinates to be:

$$E(\rho, \phi, z) = \sum_{l\rho} C_{l\rho} E_0 \frac{w_0}{w(z)}\left(\frac{\sqrt{2}\rho}{w(z)}\right)^l L_l^\rho\left(\frac{\sqrt{2}\rho}{w(z)}\right) e^{-\frac{\rho^2}{w^2(t)}} e^{-j(2\rho+l+1)\tan^{-1}\frac{z}{z_0}} e^{jl\phi} e^{j\frac{k\rho^2}{2R(z)}}$$

The equation $$L_l^\rho\left(\frac{\sqrt{2}\rho}{w(z)}\right)$$

may also be shown as $$L_l^\rho\left[\frac{2\rho^2}{w^2(t)}\right].$$

The lowest mode is the most important mode and in fact this transverse mode is identical for both rectangular and cylindrical coordinates.

$$\varphi(l, P; z) = (2P + l + 1)\tan^{-1}\frac{z}{z_0}$$

$$TEM_{00}^{rect} = TEM_{00}^{Cyl}$$

$$C_{00} = 1$$

$$H_0 = 1$$

$$L_0^0 = 1$$

then $$TEM_{00} \Rightarrow E(\rho, z) \sim E_0 \frac{w_0}{w(z)} e^{-\frac{\rho^2}{w^2(t)}} e^{-j\tan^{-1}\frac{z}{z_0}} e^{jk\frac{\rho^2}{2R(z)}}$$

Figure 7:
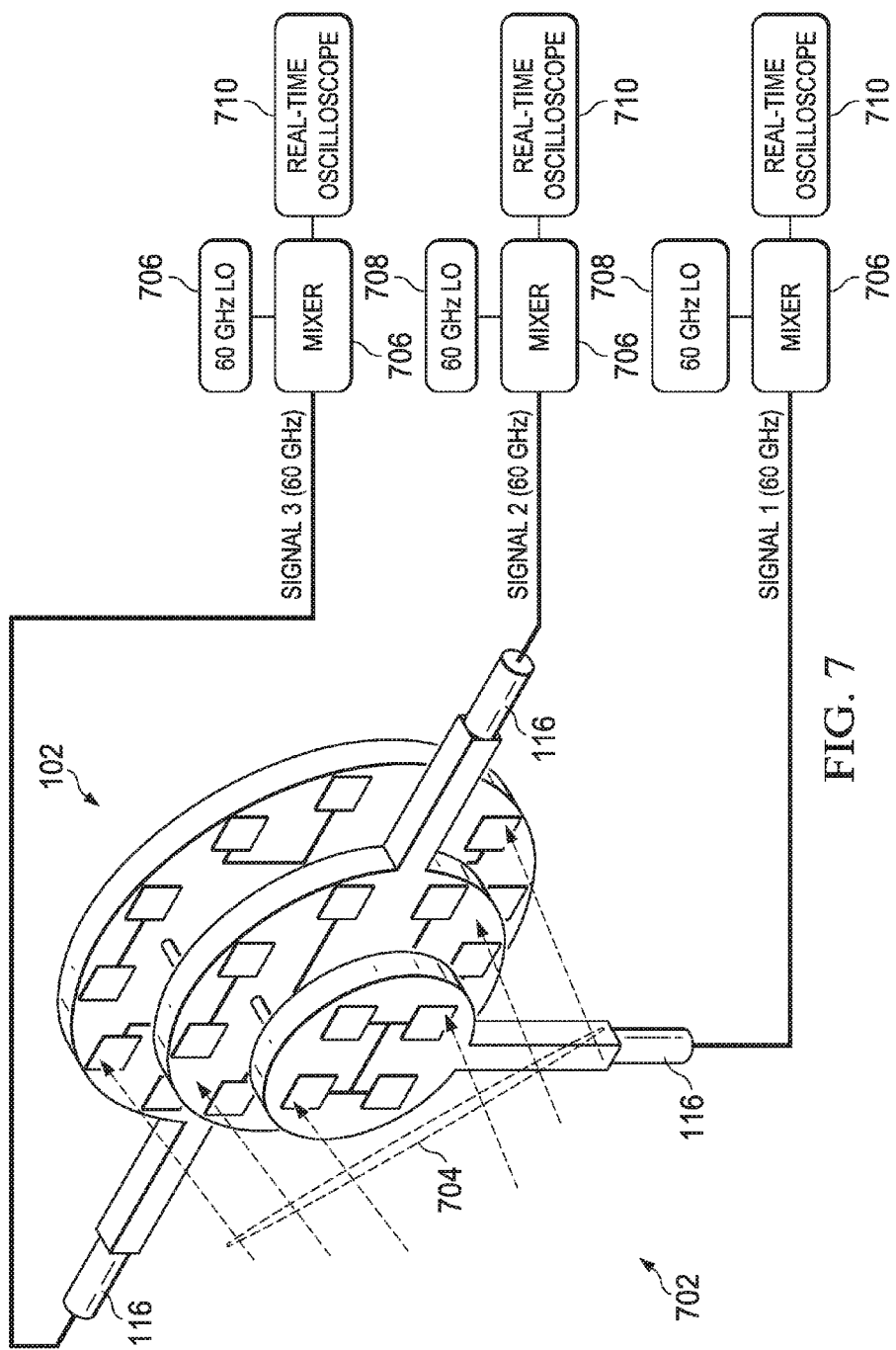
FIG. 7 illustrates a receiver for use with a multilayer patch antenna array.

Referring now to FIG. 7, there is illustrated a receiver 702 for demultiplexing signals received from a multiplexed signal generated using the transmitter 502 of FIG. 5. The receiver 702 includes a multilayer patch antenna array 102 such as that described herein above. The multilayer patch antenna array 102 receives the incoming multiplexed signal 704 and each layer 104, 106, 108 of the antenna array 102 will extract a particular order of the received multiplexed signal from each of the connector outputs 116 of a particular layer. The signals from each of the connectors 116 are applied to a mixer circuit 706 that demultiplexes the received signal in a manner similar to that discussed with respect to U.S. patent application Ser. No. 14/323,082 using a 60 GHz local oscillator signal from oscillator 708. The demultiplexed signal may then be read using, for example, a real-time oscilloscope 710 or other signal reading device. Each of the three transmitted signals is thus decoded at the receiver 702 that were transmitted in each of the ordered OAM signals received from the transmitters 602. In a further embodiment, a demultiplexing approach using SPP (spiral phase plate) may also be applied to detect OAM channels.

The signals transmitted by the transmitter 502 or the receiver 702 may be used for the transmission of information between two locations in a variety of matters. These include there use in both front haul communications and back haul communications within a telecommunications or data network.

Figure 8:
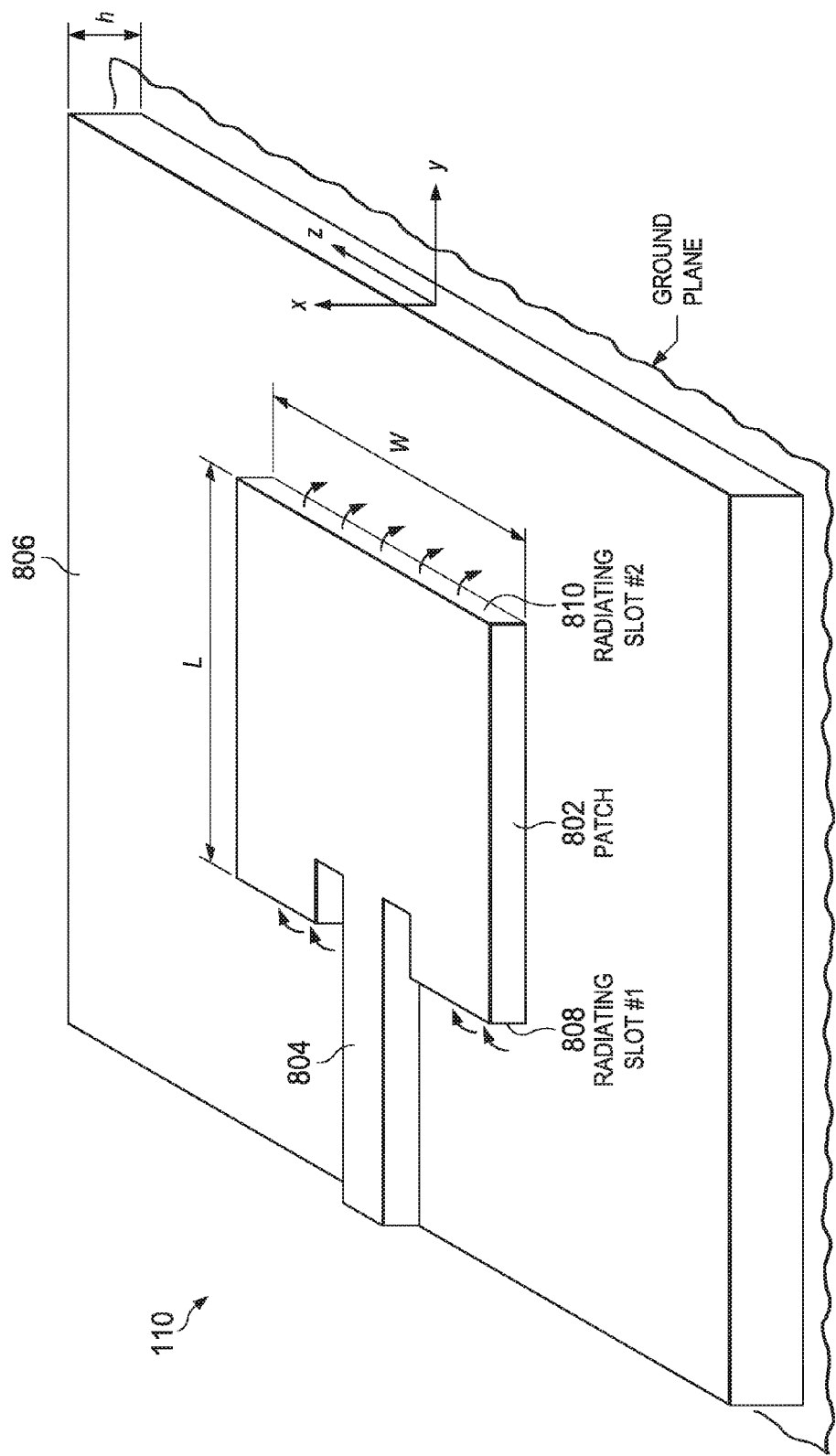
FIG. 8 illustrates a microstrip patch antenna.
Figure 9:
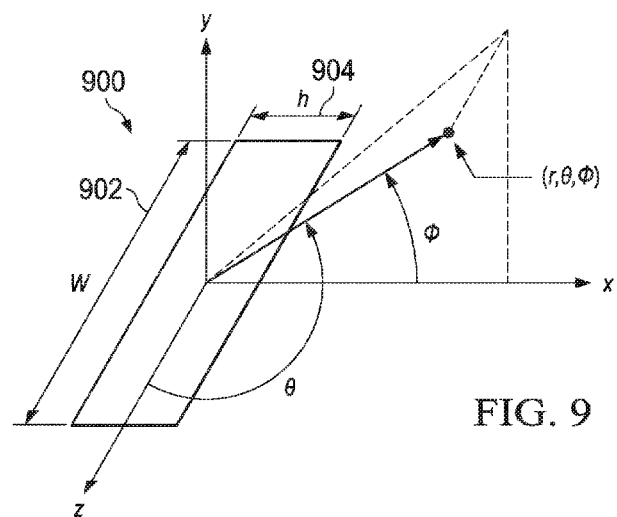
FIG. 9 illustrates a coordinate system for an aperture of a microstrip patch antenna.

Referring now more particularly to FIG. 8, there is illustrated a patch antenna element 110. Multiple ones of these patch antenna elements 110 are located upon the multilayer patch antenna array 102 as discussed hereinabove. The antenna element 110 includes a patch 802 having a length L and a width W. The patch 802 is fed from an input transmission line 804 that is connected with the feed network 104 (FIG. 1) and is resting upon a substrate 806 having a height h. The microstrip patch antenna includes a first radiating slot 808 along a first edge of the patch 802 and a second radiating slot 810 along a second edge of the patch 802. The electronic field at the aperture of each slot can be decomposed into X and Y components as illustrated in FIG. 9. The Y components are out of phase and cancel out because of the half wavelength transmission line 804. The radiating fields can be determined by treating the antenna as an aperture 900 as shown in FIG. 9 having a width W 902 and a height h 904.

The transmission line model can be further analyzed in the following manner. $G_r$ is the slot conductance and $B_r$ is the slot susceptance. They may be determined according to the equations:

$$G_r = \begin{cases} \frac{W^2}{90\lambda_0^2} & \text{for } W < \lambda_0 \\ \frac{W}{120\lambda_0} & \text{for } W > \lambda_0 \end{cases}$$

$$B_r = \frac{2\pi\Delta l \sqrt{\varepsilon_{eff}}}{\lambda_0 Z_0}$$

The input admittance of the patch antenna 110 can be approximated as:

$$Y_{in} = Y_{slot} + Y_0 \frac{Y_{slot} + jY_0\tan(\beta(L + 2\Delta l))}{Y_0 + jY_{slot}\tan(\beta(L + 2\Delta l))}$$

where $\Delta l$ is the end effect of the microstrip.

The rectangular patch antenna 110 will resonate when the imaginary part of the input admittance goes to zero.

The end effect may be calculated according to the equation:

$$\Delta l = 0.412h\left(\frac{\varepsilon_{eff} + 0.3}{\varepsilon_{eff} - 0.258}\right)\frac{(W/h) + 0.264}{(W/h) + 0.8}$$

$$L + 2\Delta l = \frac{\lambda_g}{2} = \frac{\lambda_0}{2\sqrt{\varepsilon_{eff}}}$$

-continued $$\varepsilon_{eff} = \frac{\varepsilon_r + 1}{2} + \frac{\varepsilon_r - 1}{2}\left(1 + \frac{10h}{W}\right)^{-0.5}$$

The resonant frequency of the patch antenna 110 is given by:

$$f_r = \frac{C}{2\sqrt{\varepsilon_{eff}}(L + 2\Delta l)}$$

Typically the width W of the aperture is given by:

$$W = \frac{c}{2f_r}\left(\frac{\varepsilon_r + 1}{2}\right)^{-1/2}$$

The multilayered patch antenna array 102 may transmit both Hermite Gaussian beams using the processing discussed with respect to U.S. patent application Ser. No. 14/323,082 or Laguerre Gaussian beams. When transmitting Laguerre Gaussian beams information may be transmitted in a number of fashions. A spiral phase plate and beam splitter approach may be used, a dual OAM mode antenna approach may be used or the patched antenna described herein may be utilized. These implementations would be beneficial in both fronthaul and backhaul applications.

In order to transmit several OAM modes of order l and amplitude $a_l^{OAM}$, the antenna elements must be fed by an input signal according to the equation:

$$a_n^{feed} = \frac{1}{\sqrt{N}}\sum_{l=0}^{N-1} a_l^{OAM} e^{-j2\pi\frac{ln}{N}}, n \in \{0, \ldots, N-1\},$$

Note that the number of elements in the multilayer patch antenna array 102 limits the number of possible OAM modes due to sampling. Due to aliasing, modes of order greater than N/2 are actually modes of negative orders.

$$b_l^{OAM} = \frac{1}{\sqrt{N}}\sum_{p=0}^{N-1} b_p^{feed} e^{j2\pi\frac{pl'}{N}}, p \in \{0, \ldots, N-1\},$$

$$h_{pn} = \beta e^{-jkr_{np}} \frac{\lambda}{4\pi r_{np}},$$

$$r_{pn} = \sqrt{D^2 + R_t^2 + R_r^2 - 2R_tR_r\cos(\theta_{np})},$$

$$\theta_{pn} = 2\pi\left(\frac{n-P}{N}\right),$$

$$\beta = \sqrt{g_t g_r}$$

Single Mode Link Budget $$H_{tot} = U^H H U$$

$$b^{OAM} = H_{tot} a^{OAM}$$

$$\frac{P_r}{P_t}(l) = \left|\frac{b_l^{OAM}}{a_l^{OAM}}\right|^2 = \left|\sum_{p=0}^{N-1}\sum_{n=0}^{N-1}\frac{\beta}{N}e^{-jl\theta_{np}}e^{-jkr_{np}}\frac{\lambda}{4\pi r_{np}}\right|^2$$

Asymptotic Formulation

The object is to determine an asymptotic formulation of the Link budget at large distances, i.e. when D→+(∞), we seek the leading term for each value of l Link budget−1 are the same.

The link budget is asymptotically given by:

$$\frac{P_r}{P_t}(|l|) = \left|\frac{\lambda\beta}{4\pi|l|!}\left(\frac{kR_tR_r}{2}\right)^{|l|}\frac{1}{D^{|l|+1}}\right|^2$$

From the Fraunhofer distance 2 $(2\max(R_t,R_r))^2/\lambda=200\lambda$, the link budget asymptotically tends to straight lines of slope −20 (|l|+1) dB per decade, which is consistent with an attenuation in $1/D^{2|l|+2}$.

Asymptotic Expressions with Gains and Free Space Losses

Gains and free space losses may be determined by:

$$\frac{P_r}{P_t}(|l|) = \frac{Ng_t}{|l|!}\left(\frac{4\pi(\pi R_t^2)}{\lambda^2}\right)^{|l|}\frac{Ng_r}{|l|!}\left(\frac{4\pi(\pi R_r^2)}{\lambda^2}\right)^{|l|}\left(\frac{\lambda}{4\pi D}\right)^{2|l|+2}$$

$$L_{FS_{eq}}(l) = \left(\frac{4\pi D}{\lambda}\right)^{2|l|+2}$$

$$G_{eq}(l) = \frac{Ng}{|l|!}\left(\frac{4\pi(\pi R^2)}{\lambda^2}\right)^{|l|}$$

For a fixed value of |l|, each equivalent gain increases $R^{2|l|}$. So that the link budget improves by a factor of $R^{4|l|}$. On the contrary, for a fixed value of R, when |l| increases, the link budget decreases since asymptotically the effect of D is greater than those of $R_t$ and $R_r$.

Figure 10:
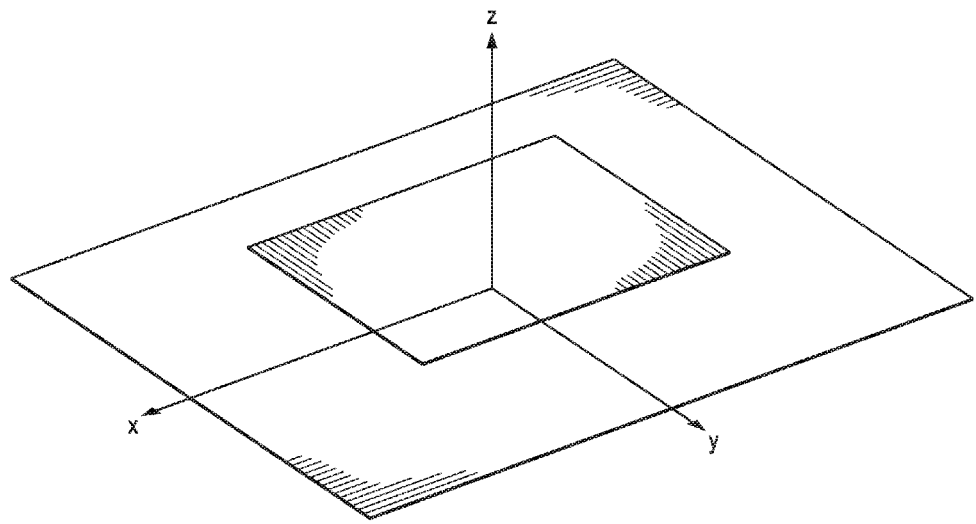
FIG. 10 illustrates a 3-D model of a single rectangular patch antenna.
Figure 11:
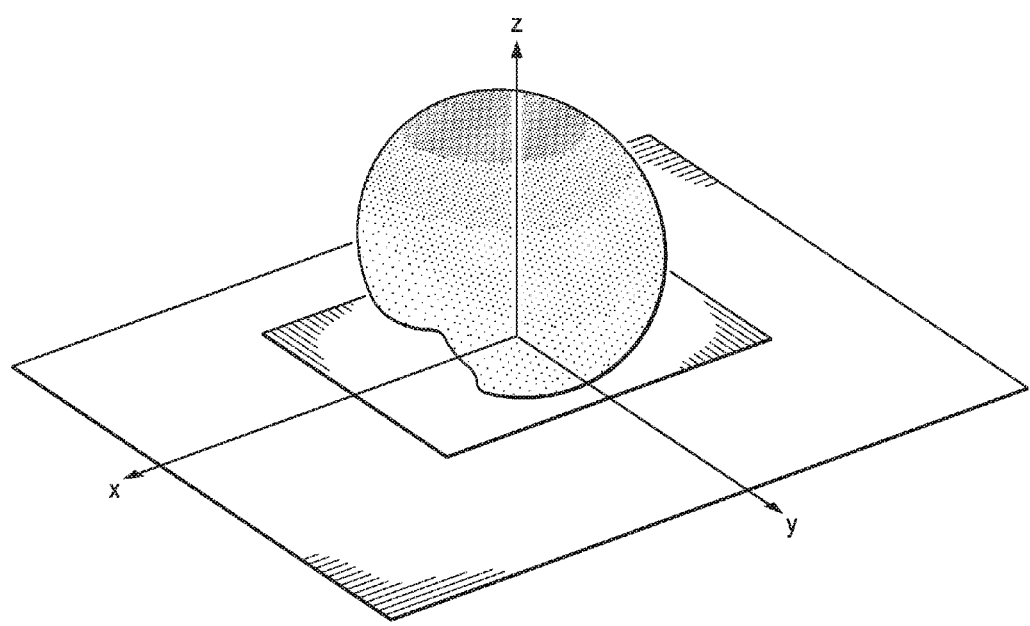
FIG. 11 illustrates the radiation pattern of the patch antenna of FIG. 10.

Referring now to FIG. 10, there is illustrated a 3-D model of a single rectangular patch antenna designed for 2.42 GHz and only one linear polarization. The radiation pattern for this antenna is illustrated in FIG. 11.

Figure 12A:
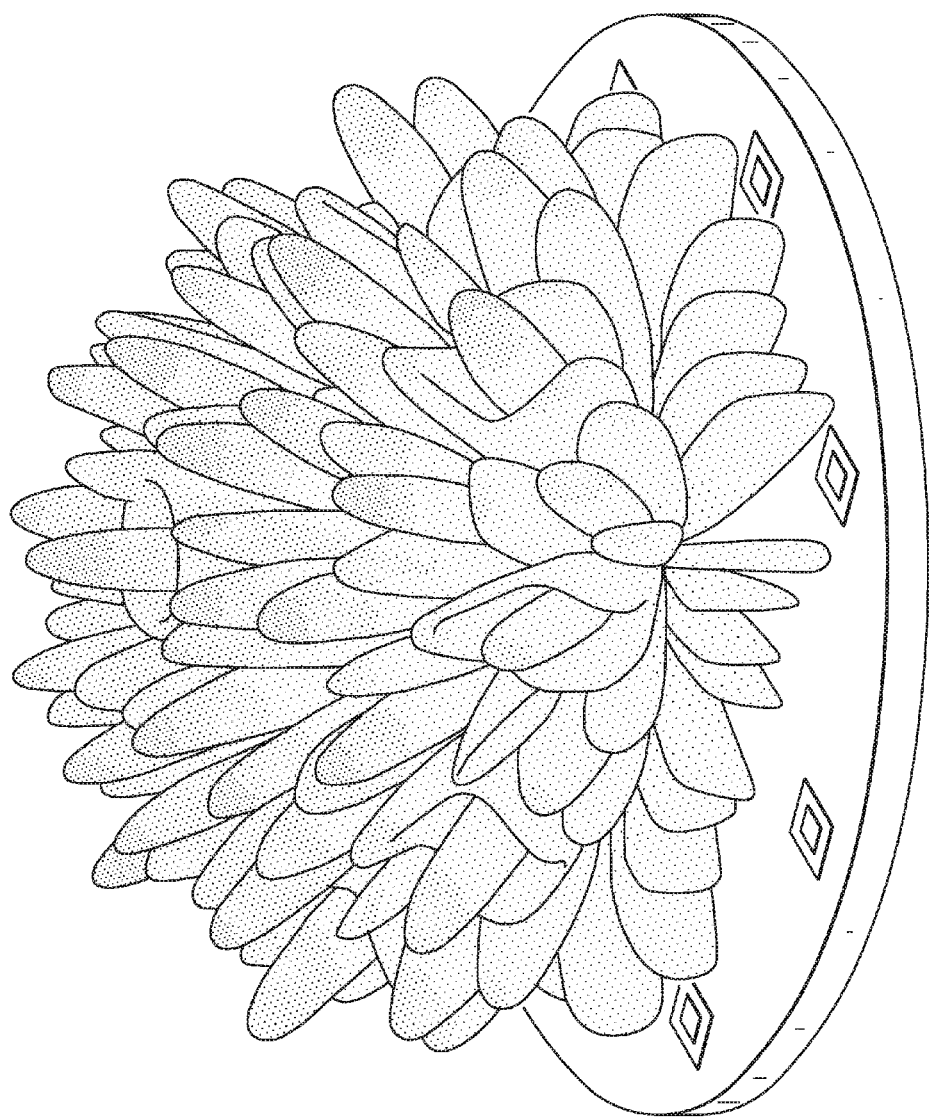
FIG. 12a illustrates the radiation pattern of a circular array for an OAM mode order $l=0$.
Figure 12B:
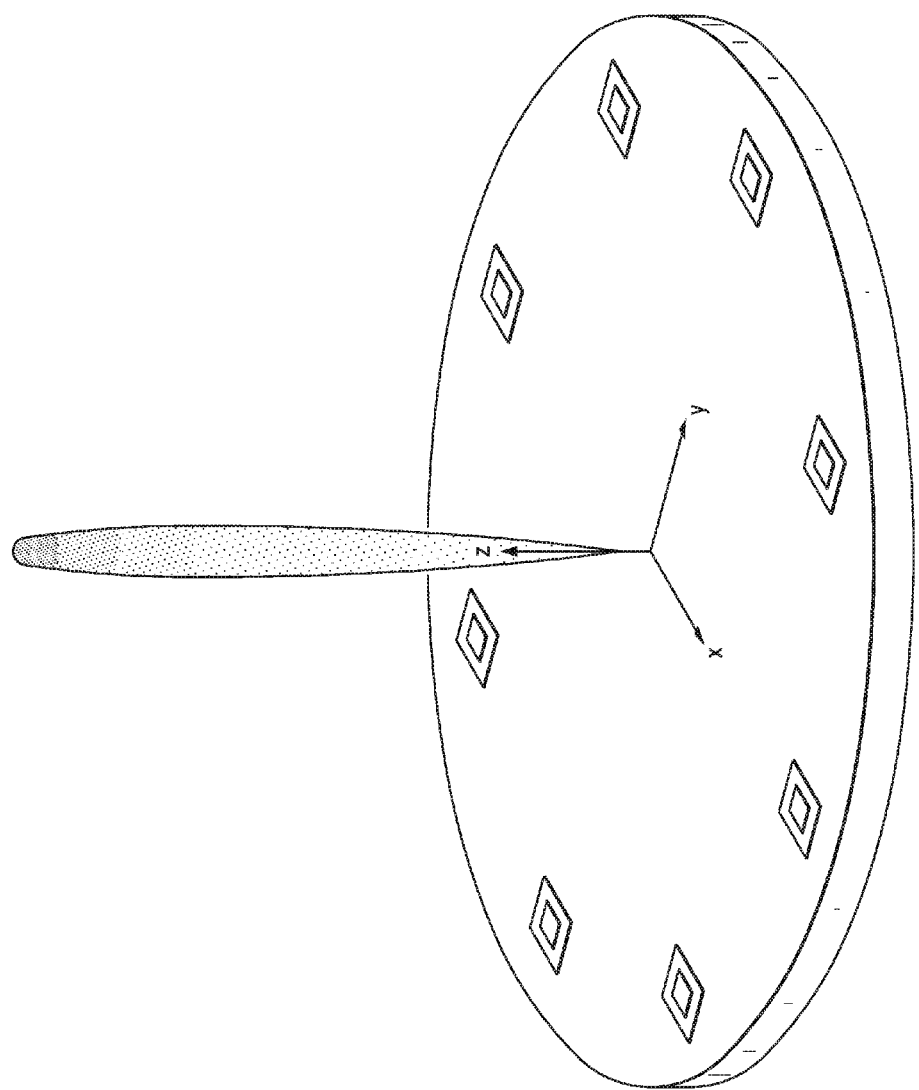
FIG. 12b illustrates the radiation pattern for an OAM mode order $l=0$ in the vicinity of the array axis.
Figure 12C:
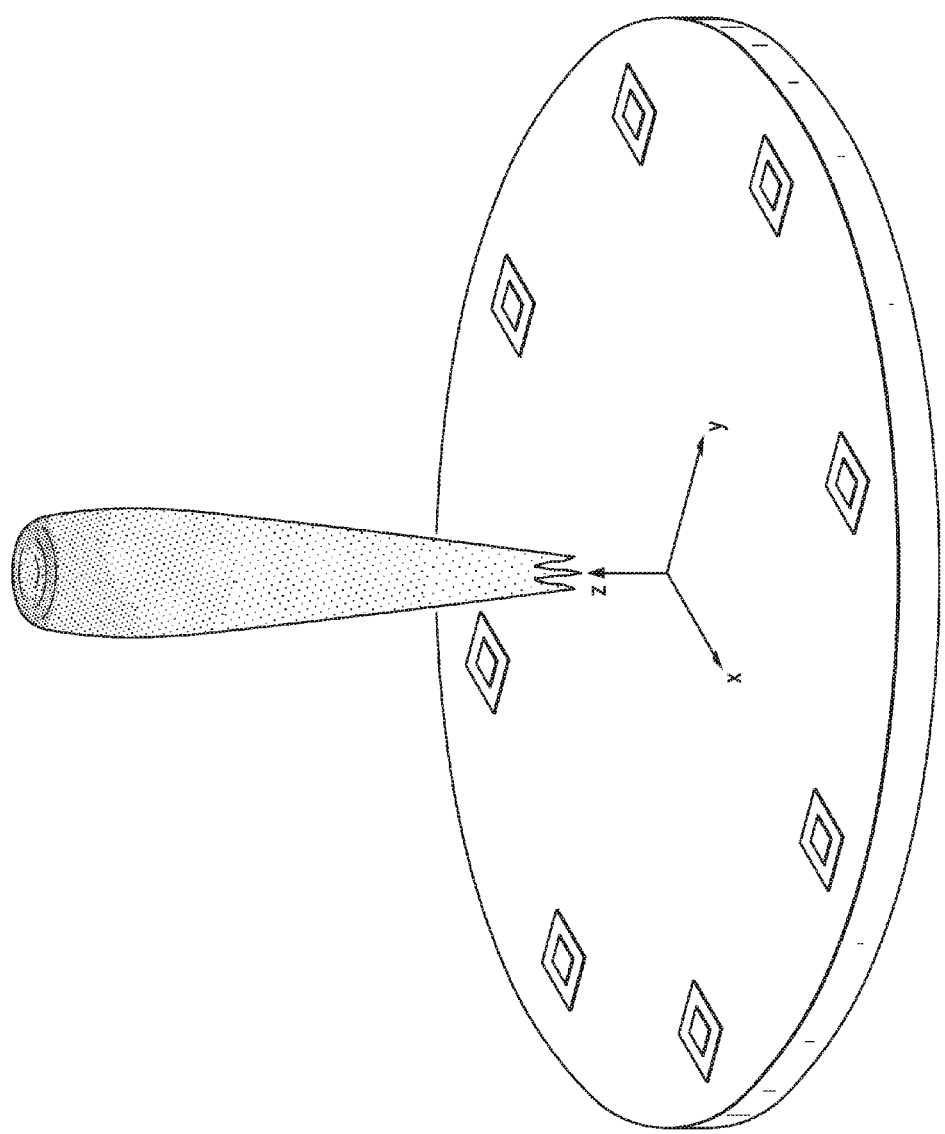
FIG. 12c illustrates the radiation pattern for an OAM mode order $l=1$ in the vicinity of the array axis.
Figure 12D:
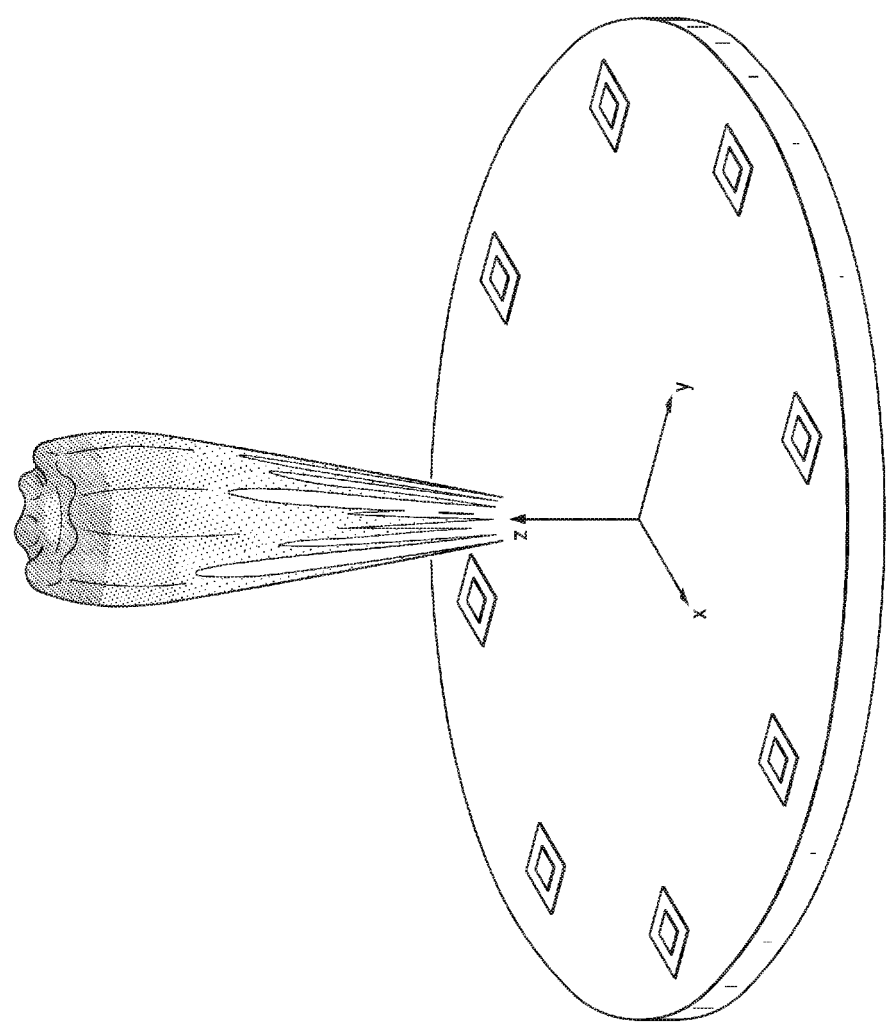
FIG. 12d illustrates the radiation pattern for an OAM mode order $l=2$ in the vicinity of the array axis.

FIG. 12a illustrates the radiation patterns of the circular array for an OAM mode order l=0 due to the higher grating lobes. FIGS. 12b, 12c and 12d illustrate the radiation patterns for the OAM mode orders in l=0 (FIG. 12b), l=1 (FIG. 12c), and l=2 (FIG. 12d) in the vicinity of the array axis.

Asymptotic OAM path loss is illustrated by:

$$\frac{P_r}{P_t}(|l|) = \frac{Ng_t}{|l|!}\left(\frac{4\pi(\pi R_t^2)}{\lambda^2}\right)^{|l|}\frac{Ng_r}{|l|!}\left(\frac{4\pi(\pi R_r^2)}{\lambda^2}\right)^{|l|}\left(\frac{\lambda}{4\pi D}\right)^{2|l|+2}$$

When assuming e-band frequencies, a distance of 1000 m and a reasonable patch antenna element gains, other parameters may be calculated including the diameter for the transmitter and receiver array rings, number of antennas, etc.

Figure 13:
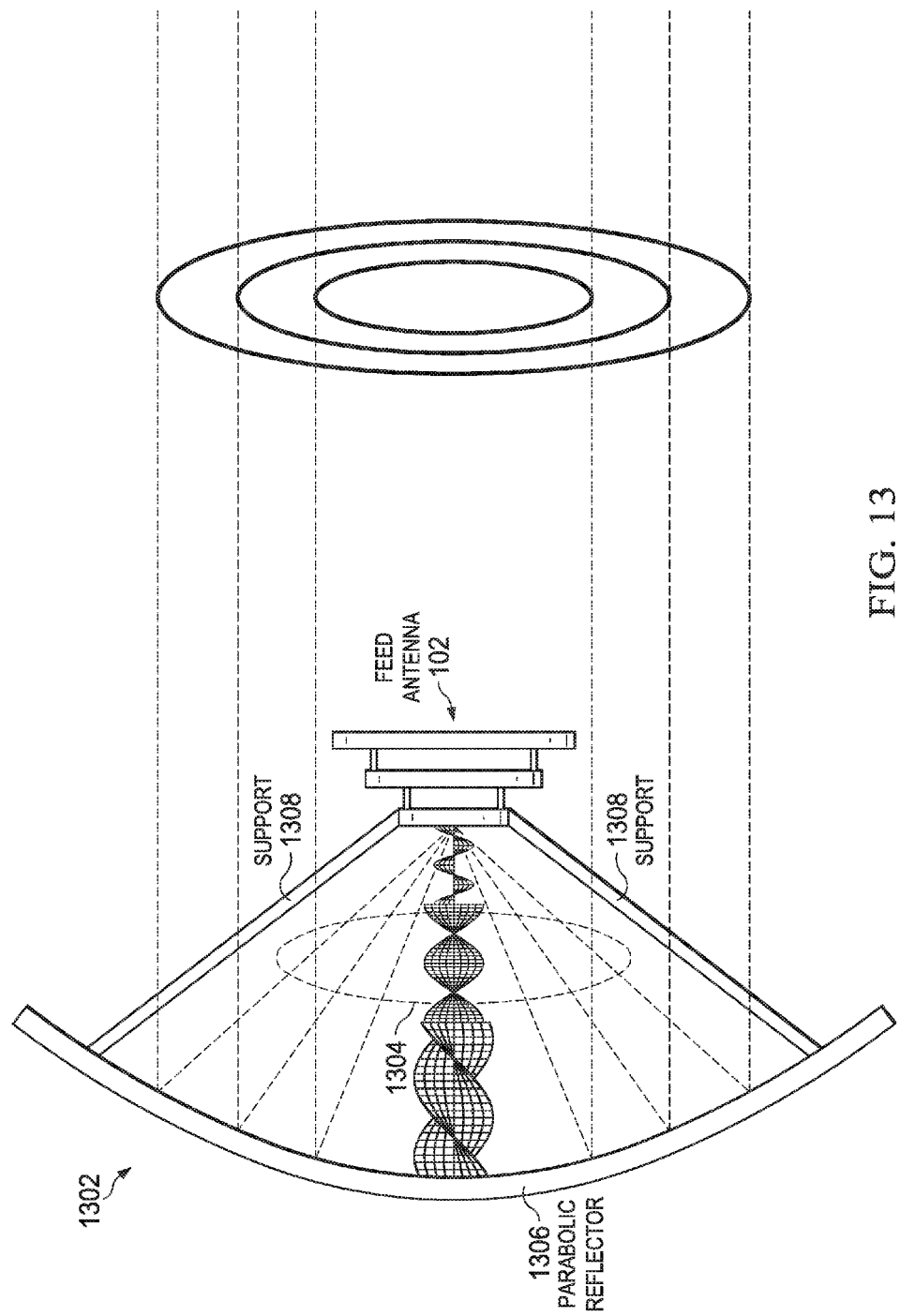
FIG. 13 illustrates a multilayer patch antenna array with a parabolic reflector.

FIG. 13 illustrates the use of a multilevel patch antenna array in a parabolic antenna 1302. The multilevel patch antenna array 102 is positioned at the focus point of a parabolic reflector 1306 to radiate its output signal 1304 to reflect off of the parabolic reflector 1306. The patch antenna array 102 is mounted to the parabolic reflector 1302 via structural support members 1308. The parabolic reflector 1306 reflects the multiplexed beam that may then be detected at some type of receiving antenna. The approach has been shown to provide a higher gain output for the antenna over one only including a multilevel patch antenna array 102 without a parabolic reflector 1306.

Figure 14:
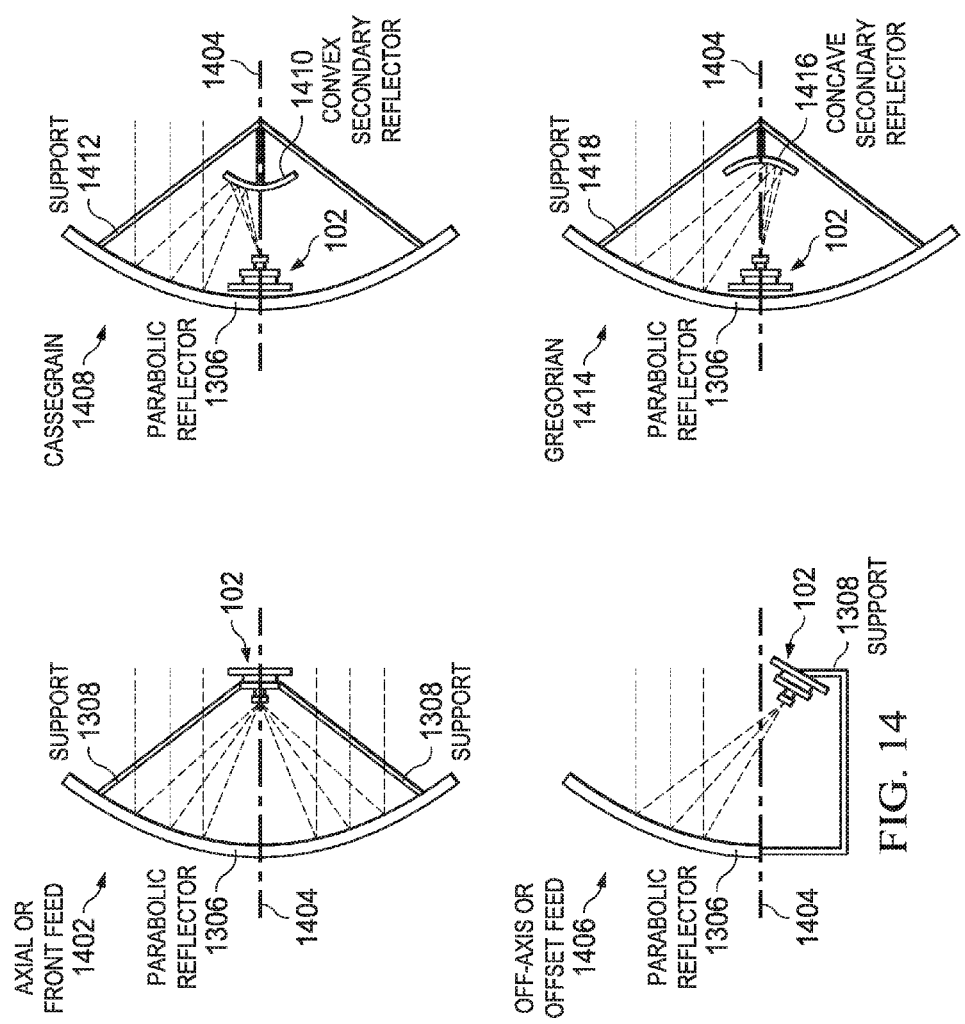
FIG. 14 illustrates various configurations of the patch antenna and parabolic reflector.

Referring now to FIG. 14, there are illustrated a number of implementations using the multilevel patch antenna array 102 and parabolic reflector 1306. In the axial or FriendFeed implementation 1402, the patch antenna array 102 is positioned at the focal point of the parabolic reflector 1306 by the supports 1308 to radiate signals directly into the parabolic reflector 1306 along a central axis 1404. The reflected beam will then come straight off of the parabolic reflector 1306 and parallel to each other. If the patch antenna array is moved by an offset O form the focal point away from the parabolic reflector 1306, the reflected beam from the parabolic reflector will focus at a particular point. In this manner by moving the array along the axis of the focus point the reflected beam can be focused at desired points along the axis. The off axis or offset feed approach 1406 positions the patch antenna array 102 off of the central axis 1404 to radiate the beam at an angle to the central axis 1404 to reflect off of the parabolic reflector 1306. The patch antenna array 102 is held in its off axis position by support member 1308.

In the Cassegrain configuration 1408, the multilevel patch antenna array 102 is positioned on the primary parabolic reflector 1306 and reflects outward toward a convex secondary reflector 1410 held in place by secondary reflector support members 1412. The radiated signal reflects off of the convex reflector 1410 at an angle similar to the off axis reflection of implementation 1406 and reflects a second time off the surface of the parabolic reflector 1306.

Finally, the Gregorian implementation 1414 mounts the multilevel patch antenna array 102 on the surface of the parabolic reflector 1306 to project outward toward a concave secondary reflector 1416. The secondary reflector 1416 is supported by secondary reflector supports 1418. The signal radiated by the multilevel patch antenna array 102 reflects off of the secondary reflector 1416, and a second time off of the primary parabolic reflector 1306. Each of these cases direct the Hermite Gaussian, Laguerre Gaussian, orthogonal function multiplexed beam outward toward a receiver.

The asymptotic OAM path loss using a parabolic antenna revises the previous loss equations in the following manner:

$$\frac{P_r}{P_t}(|l|) = \frac{Ng_t}{|l|!}\left(\frac{4\pi(\pi R_t^2)}{\lambda^2}\right)^{|l|}\frac{Ng_r}{|l|!}\left(\frac{4\pi(\pi R_r^2)}{\lambda^2}\right)^{|l|}\left(\frac{\lambda}{4\pi D}\right)^{2|l|+2}G_{New}$$

The term $G_{New}$ comprises the new variable arising due to the parabolic antenna. As previously discussed, assuming e-band frequencies, a distance of 1000 m and a reasonable patch antenna element gains, other parameters may be calculated including the diameter for the transmitter and receiver array rings, number of antennas, etc.

The new loss equation may be further solved in the following manner:

$$\frac{P_r}{P_t}(|l|) = \frac{Ng_t}{|l|!}\left(\frac{4\pi(\pi R_t^2)}{\lambda^2}\right)^{|l|}\frac{Ng_r}{|l|!}\left(\frac{4\pi(\pi R_r^2)}{\lambda^2}\right)^{|l|}\left(\frac{\lambda}{4\pi D}\right)^{2|l|+2}G_{New}$$

$$G_{New} = \frac{4\pi(\pi R_A^2)}{\lambda^2}e_A$$

$$\frac{P_r}{P_t}(|l|) = \frac{Ng_t}{|l|!}\left(\frac{4\pi(\pi R_t^2)}{\lambda^2}\right)^{|l|}\frac{Ng_r}{|l|!}\left(\frac{4\pi(\pi R_r^2)}{\lambda^2}\right)^{|l|}\left(\frac{\lambda}{4\pi D}\right)^{2|l|+2}\frac{4\pi(\pi R_A^2)}{\lambda^2}e_A$$

Where R equals the radius of the parabolic antenna and $e_A$ is the aperture efficiency of the parabolic antenna 0.55 to 0.70.

Figure 15:
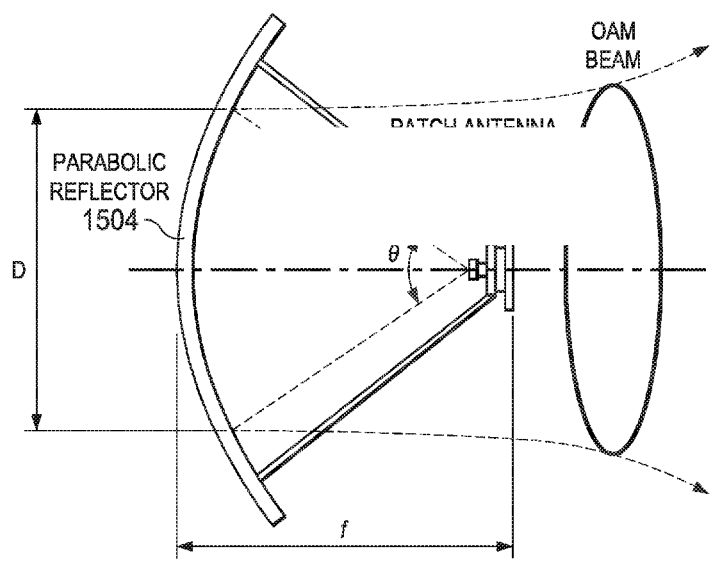
FIG. 15 illustrates a hybrid patch and parabolic antenna using a single reflector.
Figure 16:
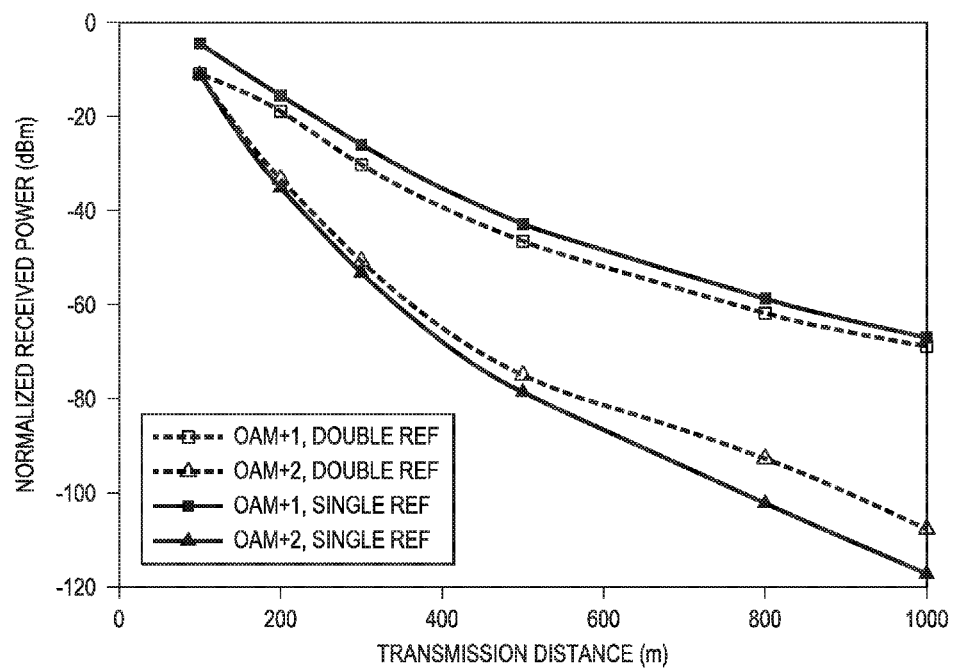
FIG. 16 illustrates the simulated results of received power as a function of transmission distance with a single reflection and double reflection hybrid patch and parabolic antenna.

Referring now to FIG. 15, a hybrid patch antenna 1502 and parabolic reflector 1504 uses a single reflection to generate an OAM beam. The patch antenna 1502 is placed at the focal point of the parabolic reflector 1504. As discussed previously, the case of double reflection wherein the patch antenna 1502 is placed at the feed of a Cassegrain antenna (see FIG. 14 reference number 1408 and 1414) and the generated OAM beams are reflected twice by a sub reflector and by the parabolic reflector. FIG. 16 illustrates simulated power as a function of a transmission distance considering both the OAM beam divergence as well as the blocking affect of a patch antenna. All the power in the example illustrated in FIG. 16 is normalized to the total power covered by the parabolic reflector. In the example illustrated in FIG. 16, the parabolic reflector is 4 feet in diameter.

The receiver sensitivities of commercially available millimeterwave communications systems have been reviewed as listed below in Table A. The potential transmission distance of using a hybrid patch antenna and parabolic dish as the transmitter taking into consideration the commercially available receiver sensitivities is illustrated.

| Company | Model | Frequency | Highest data rate | Receiver sensitivity | Estimated distance of our approach in this commercial system (transmitter power, parabolic dish diameter) | | | |
|---|---|---|---|---|---|---|---|---|
| | | | | | 10 dBm, 4 feet | 30 dBm, 4 feet | 10 dBm, 8 feet | 30 dBm, 8 feet |
| Fujitsu | GX4000 | 70/80 GHz | 3 Gbps | −54 dBm | 1 km for OAM 1, 400 m for OAM 2 | 1.8 km for OAM 1, 700 m for OAM 2 | 1.8 km for OAM 1, 1.2 km for OAM 2 | >3 km for OAM 1, 2 km for OAM 2 |
| E-band communications | E-Link 1000Q | 70/80 GHz | 1.25 Gbps | −66 dBm | 1.4 km for OAM 1, 500 m for OAM 2 | 2.5 km for OAM 1, 800 m for OAM 2 | 2.5 km for OAM 1, 1.6 km for OAM 2 | >3 km for OAM 1, 2.5 km for OAM 2 |
| | E-Link Eagle | 70/80 GHz | 3 Gbps | −48 dBm (estimated) | 800 m for OAM1, 350 m for OAM2 | 1.5 km for OAM 1, 500 m for OAM 2 | 1.5 km for OAM 1, 1 km for OAM 2 | 3 km for OAM 1, 1.7 km for OAM 2 |
| Bridge Wave | GE60 | 60 GHz | 1 Gbps | −60 dBm (estimated) | 1.2 km for OAM 1, 400 m for OAM 2 | 2.2 km for OAM 1, 700 m for OAM 2 | 2.2 km for OAM 1, 1.5 km for OAM 2 | >3 km for OAM 1, 2.2 km for OAM 2 |
| | AR60 | 60 | 1 | −60 dBm | 1.2 km for | 2.2 km for | 2.2 km for | >3 km for |

| Company | Model | Frequency | Highest data rate | Receiver sensitivity | Estimated distance of our approach in this commercial system (transmitter power, parabolic dish diameter) | | | |
|---|---|---|---|---|---|---|---|---|
| | | | | | 10 dBm, 4 feet | 30 dBm, 4 feet | 10 dBm, 8 feet | 30 dBm, 8 feet |
| | AR60X | GHz 60 GHz | Gbps 1 Gbps | (estimated) −70 dBm (estimated) | OAM 1, 400 m for OAM 2 1.6 km for OAM 1, 600 m for OAM 2 | OAM 1, 700 m for OAM 2 3 km for OAM1, 900 m for OAM 2 | OAM 1, 1.5 km for OAM 2 >3 km for OAM 1, 1.8 km for OAM 2 | OAM 1, 2.2 km for OAM 2 >3 km for OAM 1, 3 km for OAM 2 |

Figure 17:
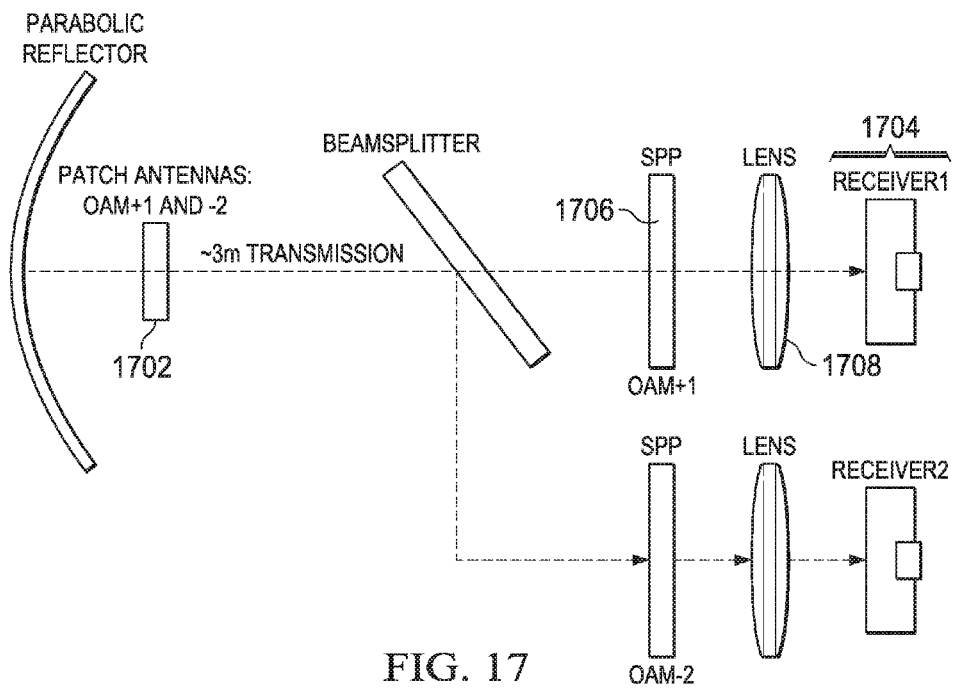
FIG. 17 illustrates an OAM multiplexed link using hybrid patch and parabolic antenna with spiral phase plate at a receiver.
Figure 18:
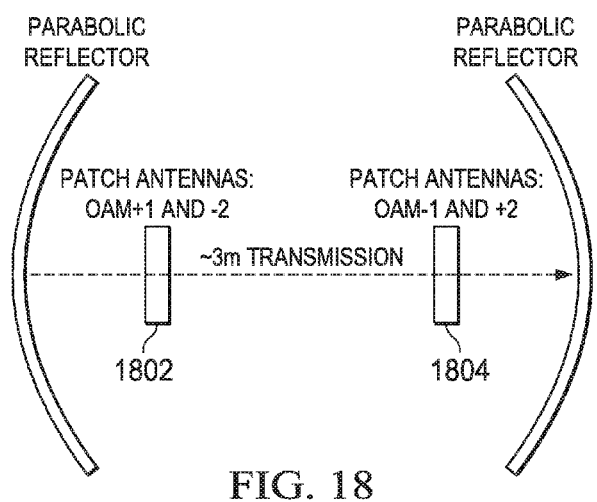
FIG. 18 illustrates an OAM multiplexed link using hybrid patch and parabolic antenna for the transmitter and the receiver.

FIG. 17 illustrates a configuration for an OAM multiplexed 60 GHz link using a hybrid patch and parabolic antenna 1702. The receivers 1704 are configured with spiral phase plates 1706 and focusing lens 1708. The spiral phase plate 1706 demultiplexes the received OAM signals. FIG. 18 illustrates another hybrid patch parabolic antenna configuration that includes a hybrid patch and parabolic antenna for both the transmitter 1802 and receiver 1804 with no beam splitters. The configurations of FIGS. 17 and 18 will use 60 GHz millimeter wave data links to multiplex OAM+1 and OAM−2 using the hybrid patch and parabolic antennas. The system using the hybrid patch and parabolic antennas will provide kilometer transmission distances.

Figure 19:
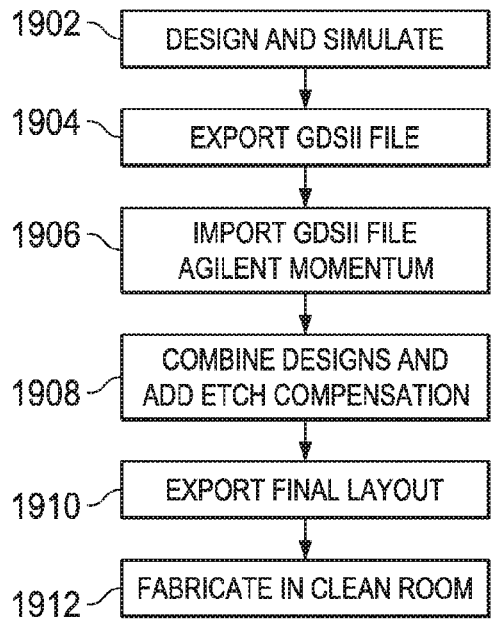
FIG. 19 is a flow diagram illustrating the design and layout process of a patch antenna.
Figure 21:
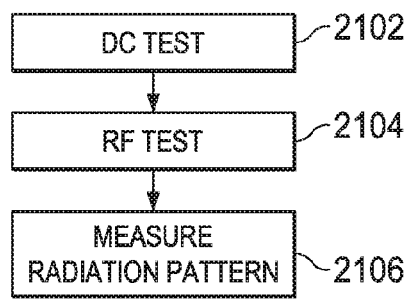
FIG. 21 is a flow diagram illustrating a testing process for a manufactured patch antenna.
Figure 20:
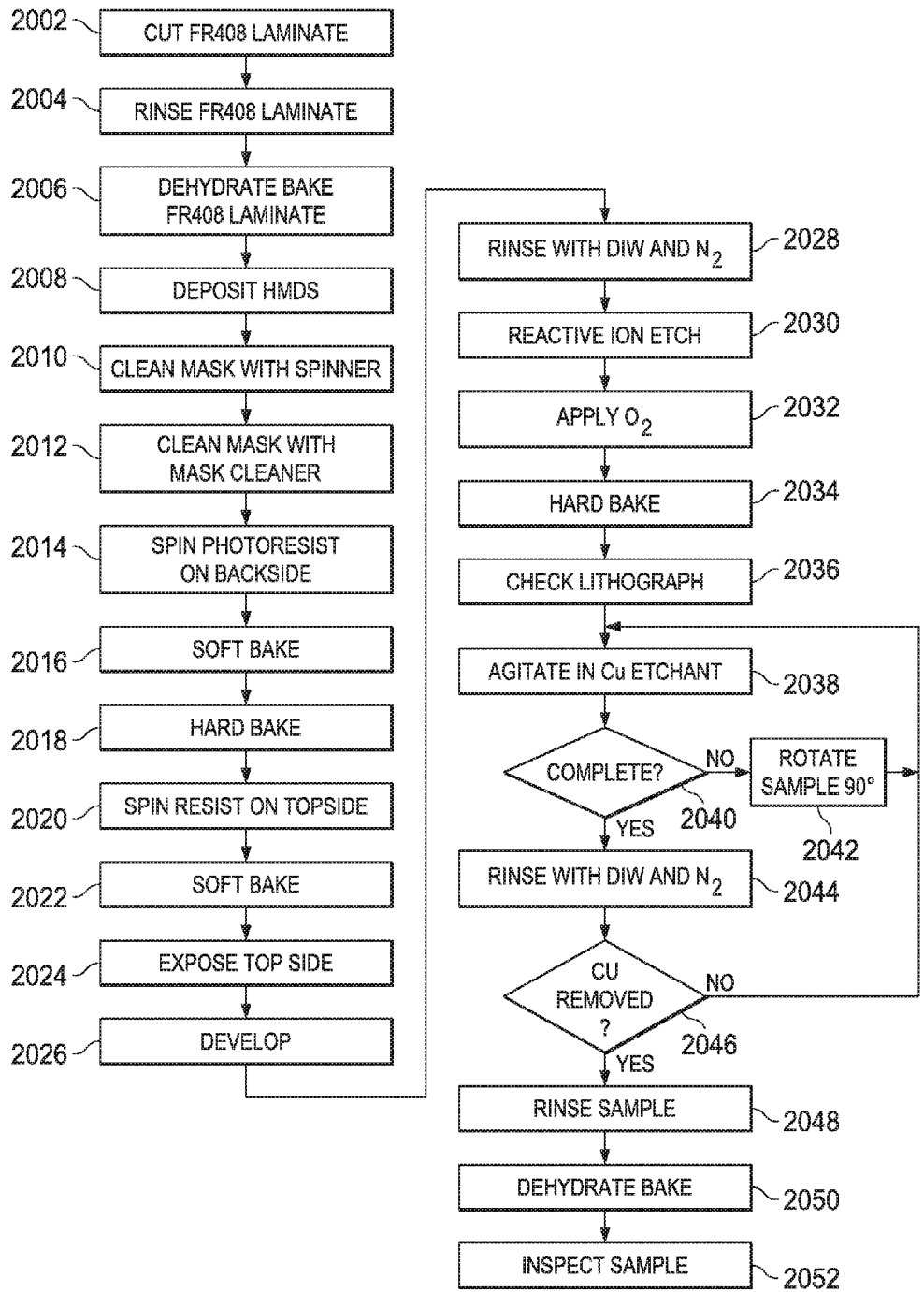
FIG. 20 is a flow diagram illustrating the process for patterning a copper layer on a laminate for a patch antenna.

The production of the patch antennas 110 are carried out through a design and layout process as generally illustrated in FIG. 19, a clean room procedure for production of the antenna as generally illustrated in FIG. 20 and a final testing process as illustrated in FIG. 21. Referring now to FIG. 19, the design and layout process is more particularly described. Initially, the patch antenna is designed and simulated at step 1902 using ANSYS HFSS with a microstrip feed structure. ANSYS HFSS comprises a high-frequency structural simulator. The software within the device stimulates 3-D full wave electromagnetic field. The ANSYS HFSS creates a GDSII file (graphic database system file used to control integrated circuit photomask plotting) from the HFSS simulation and exports the GDSII file to an AWR (Applied Wave Research Corporation) Microwave Office (MWO) layout at step 1904. In order to measure the antenna with ground signal ground probe feeding, a previously design conductor backed coplanar waveguide to microstrip transition design that has been fabricated using Agilent Momentum is also imported at step 1906 as a GDSII Agilent Momentum file into the AWR MWO Layout. The two designs are brought together at step 1908 and a weight and etch compensation of 12 μm is added to the lateral dimensions to account for isotropic wet etch used in the fabrication process. The final GDSII file for the layout is exported at step 1910 and provided to a clean room for fabrication at step 1912.

Referring now to FIG. 20, there is illustrated the clean room process for patterning a copper layer on the FR408 laminate. Initially, the double-sided Cu FR408 laminate is cut using scissors at step 2002 to an appropriate size (typically 1.5"×1.5"). The FR408 laminate is cleaned by rinsing the laminate at step 2004 with acetone, isopropanol (IPA) and nitrogen ($N_2$) and dried in a solvent hood or using program 2 of a CPK Solvent Spinner with the appropriate chuck. The laminate is dehydrate baked at 130° C. for two minutes on a hot plate (for example, a Cole Parmer digital hotplate) at step 2006. Next, at step 2008, hexamethyldisilizane (HMDS) is deposited on the laminate by a rain method using a Yield Engineering YES—310 vacuum hood oven. The laminate samples are placed in the HMDS oven for 20 minutes to improve resist adhesion. Next, at step 2010, the mask is cleaned using program 2 of a CPK Solvent Spinner with the appropriate chuck. The mask is further cleaned using an automated mask cleaner (Ultratech Mask Cleaner) using program 0 DIW only at step 2012.

The lithography process is performed at steps 2014-2034. First, Shipley S1813 photoresist is spun on to the backside of the laminate at step 2014 to protect the ground layer using for example a Brewer Science Cee Spin Coater System. In one embodiment, the spin coater system will operate at 3000 rpm with 3000 rpm/s for 60 seconds. The sample is soft baked at step 2016 at 115° C. for 90 seconds on a hot plate and hard baked at step 2018 at 130° C. for 60 seconds on the hotplate. S1813 resist is spun onto the top side pattern copper layer at step 2022. In one embodiment, this is carried out at 3000 rpm with 3000 rpm/s for 60 seconds. The sample is soft baked at 115° C. for 90 seconds on a hot plate at step 2022. The top side of the sample is exposed at step 2024 with 110 mJ/cm2 using Karl Suss MA6 BA6 Contact Aligner/Printer. Next, the circuit is developed at step 2026 with Microposit MF-319 for 60 seconds in a beaker. The sample is rinsed with deionized water (DIW) and $N_2$ in a base hood. A reactive ion etching process is performed at step 2032 to remove excess photoresist using Techniques Series 85 RIE. This is achieved by applying $O_2$ only at 180 mTorr with 50 W for 15 seconds. The sample is hard baked at step 2034 at 130° C. for 60 seconds on a hot plate. The lithography is checked at step 2036 under a Leica Inm Optical microscope to make sure the lithography is correct and that the gaps are defined and not overdeveloped.

The 12 μm copper layer is etched at steps 2038-2046. The copper is etched in one minute intervals at step 2038 by agitating the sample in a Cu etchant. Inquiry step 2040 determines if the Cu etching process is complete, and if not, the sample is rotated at step 2042 by 90° and returns to agitate the sample within the Cu etchant at step 2038. When inquiry step 2040 determines that the Cu etching process is completed control passes to step 2044 wherein the sample is rinsed with DIW and $N_2$ and dried within a base hood. The sample is checked at inquiry step 2046 using a microscope to determine if the Cu has been completely removed. If not, control passes back to step 2038 for further agitation within the Cu etchant. If all of the Cu has been removed control passes to the stripping of the photoresist process.

The stripping of the photoresist occurs by first rinsing the sample with acetone, IPA, DIW and $N_2$ and drying within a solvent hood or using program 2 in CPK Solvent Spinner with the appropriate chuck. The sample is dehydrate baked at step 2050 at 130° C. for five minutes on a hot plate. The etched laminate samples are examined at step 2052 under a microscope to make sure that gaps are etched with no over etching of areas within the sample.

The created patch antenna may be tested as illustrated in FIG. 21 to confirm operation of the antenna. Initially, at step 2102, a DC test is performed upon the antenna to make sure that the G-S-G feed is not shorted. An RF test is performed at step 2104 to measure the $S_{11}$-Return Loss across the frequency bands using Agilent VNA on Cascade M150 probe station. The radiation pattern of the antenna may then be measured at step 2106 at the appropriate frequencies using a NSI spherical near field scanner.

It will be appreciated by those skilled in the art having the benefit of this disclosure that this patch antenna array for transmission of Hermite-Gaussian and Laguerre-Gaussian beams provides for the transmission of multiplexed Hermite Gaussian and Laguerre Gaussian modes in a single transmission beam. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A multi-level antenna array, comprising:
a plurality of patch antennas;
a plurality of layers, each of the plurality of layers separated from each other by a distance, each of the plurality of layers further supporting a portion of the plurality of patch antennas;
a plurality of connectors, each of the plurality of connectors associated with one of the plurality of layers, for supplying a signal for transmission by the associated layer;
a feed network on each of the plurality of layers for providing a connection between a connector of the plurality of connectors associated with the layer and the portion of the plurality of patch antennas located on the layer;
wherein each layer of the plurality of layers transmits the signal having a different orthogonal function applied thereto that multiplexes each of the signals having the different orthogonal function applied thereto onto a single transmission beam; and
a parabolic reflector for reflecting the single transmission beam from the plurality of layers of the multi-level antenna array.

2. The multi-level antenna array of claim 1 further including a secondary reflector for receiving the single transmission beam from the plurality of layers of the multi-level antenna array and directing the single transmission beam toward the parabolic reflector.

3. The multi-level antenna array of claim 1, wherein the plurality of layers of the multi-level antenna array are placed at a focal point of the parabolic reflector.

4. The multi-level antenna array of claim 1, wherein the different orthogonal function comprises one of a Hermite-Gaussian function, a Laguerre-Gaussian function or an Ince-Gaussian function.

5. The multi-level antenna array of claim 1, wherein the plurality of patch antennas in each of the plurality of layers are configured in at least one of a rectangular, circular or elliptical configuration.

6. The multi-level antenna array of claim 1, wherein each of the plurality of patch antennas on a layer of the plurality of layers have a different phase applied thereto.

7. The multi-level antenna array of claim 1, wherein the single transmission beam is transmitted on a single frequency.

8. The multi-level antenna array of claim 1, wherein the different orthogonal function comprises one of a Jacobi polynomial function, Gegenbauer polynomial function, Legendre polynomial function, Chebyshev polynomial function, Legendre function, Bessel function or prolate spheroidal function.

9. A system for transmitting a transmission beam comprising:
a transmitter including a first multi-level patch antenna array for modulating and transmitting the transmission beam, the first multi-level patch antenna array further comprising:
a first plurality of patch antennas;
a first plurality of layers, each of the first plurality of layers separated from each other by a distance, each of the first plurality of layers further supporting a portion of the first plurality of patch antennas;
a first plurality of connectors, each of the first plurality of connectors associated with one of the first plurality of layers, for supplying a signal for transmission by the associated layer;
a first feed network on each of the first plurality of layers for providing a connection between a first connector of the first plurality of connectors associated with the layer and the portion of the first plurality of patch antennas located on the layer;
wherein each layer of the first plurality of layers transmits the signal having a different orthogonal function applied thereto that multiplexes each of the signals having the different orthogonal function applied thereto onto a single transmission beam; and
a first parabolic reflector for reflecting the single transmission beam from the first plurality of layers of the multi-level antenna array;
a receiver including a second multi-level patch antenna array for receiving and demodulating the transmission beam, the second multi-level patch antenna array further comprising:
a second plurality of patch antennas;
a second plurality of layers, each of the second plurality of layers separated from each other by a distance, each of the second plurality of layers further supporting a portion of the second plurality of patch antennas;
a second plurality of connectors, each of the second plurality of connectors associated with one of the second plurality of layers, for supplying a signal received by the associated layer;
a second feed network on each of the second plurality of layers for providing a connection between a connector of the second plurality of connectors associated with the layer and the portion of the second plurality of patch antennas located on the layer;
wherein each layer of the second plurality of layers receives the signal having the different orthogonal function applied thereto that demultiplexes each of the signals having the different orthogonal function applied from the single transmission beam; and a parabolic reflector for reflecting the single transmission beam to the plurality of layers of the multi-level antenna array.

10. The system of claim 9 further including a secondary reflector for receiving the single transmission beam from the first plurality of layers of the multi-level antenna array and directing the single transmission beam toward the first parabolic reflector.

11. The system of claim 9, wherein the first plurality of layers of the multi-level antenna array are placed at a focal point of the first parabolic reflector.

12. The system of claim 9, wherein the different orthogonal function comprises one of a Hermite-Gaussian function, a Laguerre-Gaussian function or an Ince-Gaussian function.

13. The system of claim 9, wherein the first plurality of patch antennas in each of the first plurality of layers are configured in at least one of a rectangular, circular or elliptical configuration.

14. The system of claim 9, wherein each of the first plurality of patch antennas on a layer of the first plurality of layers have a different phase applied thereto.

15. The system of claim 9, wherein the single transmission beam is transmitted on a single frequency.

16. The system of claim 9, wherein the different orthogonal function comprises one of a Jacobi polynomial function, Gegenbauer polynomial function, Legendre polynomial function, Chebyshev polynomial function, Legendre function, Bessel function or prolate spheroidal functions.

17. A multi-level antenna array, comprising:

a plurality of patch antennas;

a plurality of layers, each of the plurality of layers separated from each other by a distance, each of the plurality of layers further supporting a portion of the plurality of patch antennas;

a plurality of connectors, each of the plurality of connectors associated with one of the plurality of layers, for supplying a signal for transmission by the associated layer;

a feed network on each of the plurality of layers for providing a connection between a connector of the plurality of connectors associated with the layer and the portion of the plurality of patch antennas located on the layer;

wherein each layer of the plurality of layers transmits the signal having a different orthogonal function applied thereto that multiplexes each of the signals having the different orthogonal function applied thereto onto a single transmission beam.

18. The multi-level antenna array of claim 17, wherein the different orthogonal function comprises one of a Hermite-Gaussian function, a Laguerre-Gaussian function or an Ince-Gaussian function.

19. The multi-level antenna array of claim 17, wherein the plurality of patch antennas in each of the plurality of layers are configured in at least one of a rectangular, circular or elliptical configuration.

20. The multi-level antenna array of claim 17, wherein each of the plurality of a patch antennas on a layer of the plurality of layers have a different phase applied thereto.

21. The multi-level antenna array of claim 17, wherein the single transmission beam is transmitted on a single frequency.

22. The multi-level antenna array of claim 17, wherein the different orthogonal function comprises one of a Jacobi polynomial function, Gegenbauer polynomial function, Legendre polynomial function, Chebyshev polynomial function, Legendre function, Bessel function or prolate spheroidal functions.

* * * * *